US006404438B1

(12) United States Patent
Hatlelid et al.

(10) Patent No.: US 6,404,438 B1
(45) Date of Patent: Jun. 11, 2002

(54) BEHAVIORAL LEARNING FOR A VISUAL REPRESENTATION IN A COMMUNICATION ENVIRONMENT

(75) Inventors: Kris E. Hatlelid, Coquitlam; William D. Harrison, North Vancouver; Ken G. Kavanagh, Port Coquitlam, all of (CA)

(73) Assignee: Electronic Arts, Inc., Redwood City, CA (US)

( * ) Notice: Subject to any disclaimer, the term of this patent is extended or adjusted under 35 U.S.C. 154(b) by 0 days.

(21) Appl. No.: 09/468,730

(22) Filed: Dec. 21, 1999

(51) Int. Cl.[7] ................................................ G06T 15/70
(52) U.S. Cl. ........................................ 345/473; 434/350
(58) Field of Search ................................. 345/473, 475, 345/949; 434/350

(56) References Cited

U.S. PATENT DOCUMENTS 5,727,950 A * 3/1998 Cook et al. ................. 434/350
6,031,549 A * 2/2000 Hayes-Roth ................ 345/474

* cited by examiner

*Primary Examiner*—Mark Zimmerman
*Assistant Examiner*—Lance W. Sealey
(74) *Attorney, Agent, or Firm*—Townsend and Townsend and Crew LLP; Gerald T. Gray

(57) ABSTRACT

Utterances comprising text and behavioral movement commands entered by a user are processed to identify patterns of behavioral movements executed by the user's visual representation. Once identified, the patterns are used to generate behavioral movements responsive to new utterances received from the user, without requiring the user to explicitly alter the behavioral characteristics selected by the user. An application module parses an utterance generated by a user to determine the presence of gesture commands. If a gesture command is found in an utterance, the utterance is stored for behavioral learning processing. A stored utterance is analyzed with existing stored utterances to determine if the stored utterances provide the basis for creating a new behavioral rule. Newly stored utterances are first analyzed to generate different contexts associated with the behavioral movement. To determine if any of the contexts should be used as a basis for a new behavioral rule in an embodiment in which contexts are stored, the contexts of the existing utterances in the log are compared with the new contexts. If a context appears in the log at a frequency above a threshold, then the context is used as the basis for a new behavioral rule. The new behavioral rule is then used to modify existing rules, or create more generally applicable rules. New general rules are not created unless the number of existing rules that could create a behavioral rule exceeds a threshold to control how persistent a user's behavior must be to create a new rule.

27 Claims, 34 Drawing Sheets

BEHAVIORAL LEARNING FOR A VISUAL REPRESENTATION IN A COMMUNICATION ENVIRONMENT

TECHNICAL FIELD

The present invention relates generally to the field of telecommunication, more particularly to the field of telecommunications in which graphical user icons are used for communication in which behavior is learned.

RELATED APPLICATIONS

This application is a continuation-in-part of co-pending application Ser. No. 09/415,769 filed Oct. 8, 1999, assigned to the assignee of the present application and which is hereby incorporated by reference.

BACKGROUND OF THE INVENTION

In visual representation-based environments in which a user controls a virtual representation to interact with other users, the visual representation personality can be initially selected by the user to reflect generally the user's own behavior and personality. For example, as described in co-pending application Ser. No. 09/415,769 (hereinafter "parent application") a user can select from a variety of personality types to represent the user, including 'hip-hop,' 'upper-class,' 'rocker', or the like. The embodiments described in the parent application also allowed a user to further specify the behavior of his or her visual representation by setting mood intensity values. The mood intensity values modify the behavior of the visual representation (or visual representation) to allow the visual representation to appear, on a sliding scale, positive, indifferent, or aggressive. However, in these embodiments, the user defines the visual representation's behavior explicitly through personality and mood selections and explicit gesture commands. Because the settings are generically defined, there is a limitation on how the personalities can be tailored to match the personality of the individual user. Additionally, to modify the visual representation's behavior, the user adjusts the different settings that control the visual representation's behavior. This interface provides a limitation on the virtual representation experience, as the user is constantly aware that the user is explicitly in control of the visual representation's behavior.

Accordingly, a new system is needed in which the visual representation's behavior is modified through the natural course of using the visual representation, without requiring explicit directives provided by the user. Additionally, a system is needed in which the visual representation's behavior is modified to match more closely the behavior of the user.

SUMMARY OF THE INVENTION

A system, method, and apparatus are disclosed in which utterances entered by a user are processed to identify patterns of behavioral movements executed by the user's visual representation. Once identified, the patterns are used to generate behavioral movements responsive to new utterances received from the user, without requiring the user to explicitly alter the behavioral characteristics selected by the user. Thus, the behavior of the user's visual representation is modified without requiring explicit user directives, and the modified behavior is generated responsive to the user actual communication activity, thus ensuring that the visual representation's behavior is more closely related to the user's own personality.

More specifically, in one embodiment an application module parses an utterance generated by a user to determine the presence of gesture commands. An utterance is an input text string and optional gesture commands entered by a user through a keyboard or voice commands and processed by the application module of the present invention to generate visual representation behavioral movements. Gesture commands are explicit commands made by a user to have the visual representation act out or animate a behavioral movement or series of movements to convey a particular idea or emotion. For example, a gesture command could have the visual representation bow, wave, skip around, raise an eyebrow, or the like. The user issues a gesture command by providing a gesture command identifier along with the text portion of the utterance. Thus, an exemplary utterance is: 'Hello (wave) how are you?', where '(wave)' is a gesture command provided by the user to have the user's visual representation animate a hand wave. In a preferred embodiment, each utterance is parsed to determine the presence of gesture commands. If a gesture command is found in an utterance, the utterance is stored for behavioral learning processing.

A stored utterance is analyzed in context of the existing stored utterances to determine if the stored utterances provide the basis for creating a new behavioral rule. A behavioral rule generates behavioral movements based on natural language processing, as described in the parent application. A behavioral rule comprises a context, a weighting, and a behavioral movement. A context is a gesticulatory trigger and optionally associated word or words. A gesticulatory trigger is a linguistic category designed to organize word types into common groupings. A weighting defines the probability that the specific behavioral movement will be used; in one embodiment, the scale is 1 to 10, where 10 is a 100% probability. An exemplary behavioral rule is: {10 * Negative* shake head}. Thus, the weight value 10 specifies that the behavioral movement 'shake head' will be performed when a word classified as a Negative gesticulatory trigger is identified in an utterance.

In one embodiment, newly stored utterances are analyzed to generate different contexts associated with the behavioral movement, using the Specific gesticulatory trigger for the contexts. Gesticulatory triggers can include classes such as Prepositions, which includes any preposition, Referents, which includes words that refer to other objects such as 'this' or 'that,' Negatives, which includes negative words such as 'no' or 'not,' or Specifics, which are simply any specific word designated by quotation marks, such as 'Hi' or 'Hello'. In one embodiment, pre-assigned words are provided with each personality type in a lexicon. Each word in the lexicon has an associated behavioral movement and/or a gesticulatory trigger class. Thus, when a specific word such as 'no' is encountered in an utterance, the lexicon is checked to determine whether the word 'no' is present in the lexicon, and if it is present, to which behavioral movement it is associated, and/or to which gesticulatory trigger class it belongs.

For example, for the utterance 'Hello (wave) how are you?', generated contexts using the Specific gesticulatory trigger include 'Hello (wave)', 'Hello (wave) how', 'Hello (wave) how are', 'Hello (wave) how are you', '(wave) how', (wave) how are', etc. The different words are different Specific gesticulatory triggers. To determine if any of the contexts should be used as a basis for a new behavioral rule in an embodiment in which contexts are stored, the contexts of the existing utterances in the log are compared with the new contexts. If a context appears in the log at a frequency above a threshold, then the context is used as the basis for a new behavioral rule. For example, if the threshold is 5 appearances, and the context 'Hello (wave)' appears for the fifth time in the new logged utterance, then a new behavioral rule based on 'Hello (wave)' is generated.

In one embodiment, the new behavioral rule is generated by using the Specific gesticulatory trigger as the gesticulatory trigger for the behavioral rule, assigning an arbitrary weighting, and applying the associated gesture as the behavioral movement for the rule. Thus, in the 'Hello (wave)' example, the new behavioral rule is defined as {10, 'Hello', wave} the arbitrary weighting of 10 ensuring that a wave is animated each time the word 'hello' is recognized in an utterance transmitted by the user. However, in a preferred embodiment, the new behavioral rule is then used to modify existing rules, or create more generally applicable rules. Accordingly, the application module of the present invention examines current rules to determine if more general rules can be created from the existing rules. For example, if a new rule is created as {10, 'yup', nod}, and 'yup' is classified as an-Affirmative, the application module examines existing rules to determine whether other specifics using words belonging to the Affirmative gesticulatory trigger class and having the same associated behavioral movement are defined in existing rules. For example, if a rule exists defining {10, 'yes', nod}, and both 'yup' and 'yes' are in the lexicon and classified as being Affirmatives, then a general rule {10, * Affirmative*, nod} is created, thereby generalizing from two specific rules to a more general behavioral rule. Thus, a new, more general rule is created based on the user behavior, which provides the ability for the visual representation to learn. For example, if the user types in a new Affirmative, such as 'yeah', the application module will check the lexicon to determine a gesticulatory trigger corresponding to 'yeah'. If 'yeah' is listed as being an Affirmative, the more general rule {10, * Affirmative*, nod} will cause the visual representation to nod, in addition to whatever behavioral movement is already assigned to 'yeah', even though the user had never before issued a gesture command requesting that the visual representation nod its head after receiving the word 'yeah'. This new behavior is 'learned.'

In one embodiment, new general rules are not created unless the number of existing rules that could create a behavioral rule exceeds a threshold. This embodiment provides control over how persistent a user's behavior must be before a new rule is created. Thus, in accordance with the present invention, new behavior is implicitly provided in accordance with the present invention, and the new behavior is generated responsive to user actions.

DETAILED DESCRIPTION OF THE PREFERRED EMBODIMENT

Figure 1:
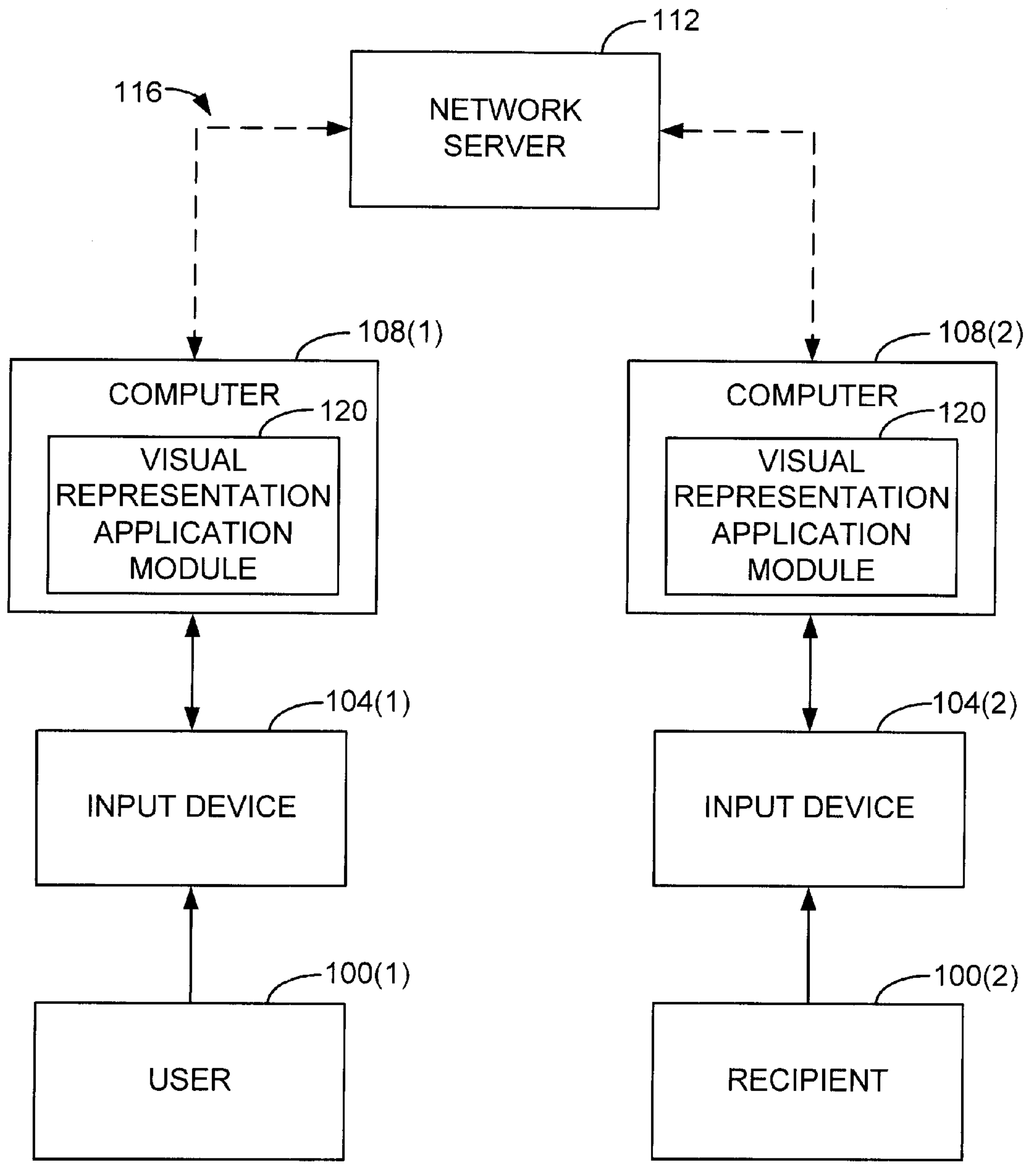
FIG. 1 is a block diagram of a data communications network in accordance with the present invention.

FIG. 1 illustrates a system 116 for remote data communication in accordance with the present invention. A user 100(1) uses an input device 104(1) to control a computer 108(1). The computer 108(1) is typically any personal computer or similar other computing device as is known in art having a monitor or other display device useful for viewing graphical data. If the user 100(1) wants to communicate to a recipient 100(2), who is a second user 100 of the system, the user 100(1) launches a visual representation application module 120 resident on the user's computer 100(1) in accordance with the present invention and connects to an available server 112. Typically, connecting to a server 112 involves opening and maintaining a persistent TCP/IP connection between the user's computer 108 and the server 112. In an alternative embodiment, the application module 120 is resident on the server 112, and user's computer merely receives the data transmitted from the server 112. Next, the user 100(1) invites a recipient 100(2) or recipients to join in a communication session, or they may join simultaneously and without invitation. If the recipient 100(2) accepts, a second persistent TCP/IP connection is established between each of the computers 108 and the server 112 to establish the communication session. A user 100(1) and recipient 100(2) are terms to arbitrarily designate for clarity a sender and receiver of information at a given point during a communication session. At any time, a recipient 100(2) can also send information. Therefore, all references to a user 100(1) made throughout this description apply equally to a recipient 100(2) when the recipient is sending data in accordance with the present invention.

One of the users 100 then produces an utterance. As discussed below, an utterance is a data string which comprises text and/or behavioral information or behavioral commands. The user's computer 108 generates a choreography sequence from the utterance. A choreography sequence is a behavioral movement or sequence of movements that a visual representation of the user 100 will perform in accordance with selected behavioral characteristics to convey an emotional context within which the text portion of the utterance is to be interpreted by some recipient. Alternatively, behavioral commands without text information are transmitted in a choreography sequence to provide independent behavioral information to recipients 100(2). The resultant choreography sequence is sent to the server 112 (as a binary TCP/IP packet) which then relays it back to all participants in the communication session where the choreography sequence is interpreted by application modules 120 resident on their computers 108, which then animates the sender's visual representation on the display(s) of the recipient(s). As is known to one of ordinary skill in the art, the networking portion of this description is only one of a myriad of possible configuration allowing users 100(1) and recipients 100(2) to communicate through computing devices. For example, users 100 may be linked over a local-area-network or they may have a direct connection established between their computers 108. All of these alternate communication configurations are considered to be within the scope of the present invention.

To initiate a communication session, a separate communications interface is used (not shown). The communications interface provides an initiate communication session button to allows the user 100(1) to invite another user 100(2) to enter a real time communication session. Alternatively, selecting an entry listed in a prestored contact list will accomplish the same functionality. Before a request to join a session is transmitted, a requester dialog box is displayed which asks the user 100 which session the invitee is to be asked to join (a new session or an existing session). Once the session type is established, a pop-up dialogue box allows the user 100 to input a short text message to accompany the request. Clicking a send button transmits the invitation, while clicking a cancel closes the requester box without sending the invitation. When inviting a person to an ongoing session, the subject field of the outgoing request contains the names of the users 100 already in the session. In one embodiment, the invention operates in conjunction with a "chat" type communication system, and the invited user 100 receives an incoming chat request event to which they may respond either Yes (after which a communication session is launched) or No (resulting in a request denial being sent back to the user 100).

FIG. 2 is an illustration of a preferred embodiment of a videophone user interface 200 in accordance with the present invention. Generally, the videophone 200 includes one window 228(1) containing a visual representation 232 of the user 100(1), and for each recipient 100(2), a window 228(2) containing a visual representation 232 for that recipient. On the recipient's computer 108(2), two similar windows are displayed to show both the user's visual representation 232 and the recipient's visual representation 232. FIG. 2 illustrates two windows 228 for a communication session; however, additional windows 228 may be added to the display as additional users 100 are added to a communication session. Further, multiple separate communication sessions may be maintained by any one user 100, and the windows 228 containing the visual representations 232 of the participants of each session are also displayed.

The videophone 200 preferably provides a personality setting box 224. The personality setting box 224 enables a user 100 to select a personality type for use in communication. The personality type selected by the user 100 will control the animated behavioral movement of the user's visual representation 232, and is discussed in more detail below. The videophone 200 also provides a mood intensity control 220 which allows the user 100 to control the animated mood of the visual representation 232 to communicate more specific behavioral information. The videophone 200 provides a gesture button 244 to invoke a gesture setting interface, and a customize button 240 is provided to allow the user to tailor the behavior of the visual representation 232 to the user's specifications.

The videophone 200 provides a behavioral and textual communication tool 212 to allow the user 100 to communicate with other users 100. The box 212 provides an area in which the user 100 can enter an utterance 204. The utterance can include text and specific, predefined behavioral commands, such as a gesture command 216 such as "bow." These specific behavioral commands control the behavioral movements of the visual representation 232 in accordance with the behavioral characteristics selected, as discussed below. A text history box 236 is also used to display the history of the communication session.

Figure 2A:
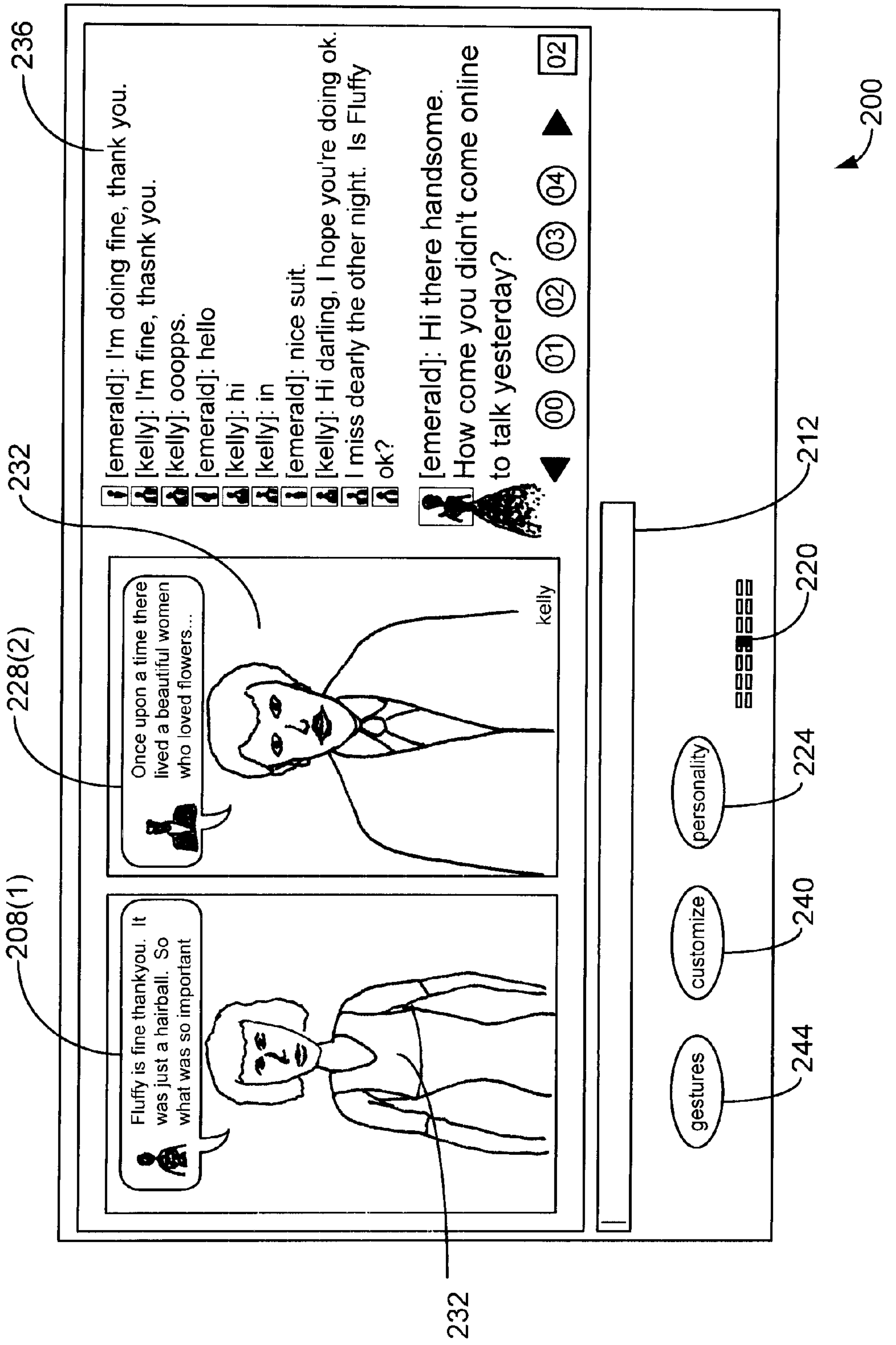
FIG. 2*a* is a block diagram of a preferred embodiment of a user interface for behavioral information communication.
Figure 2B:
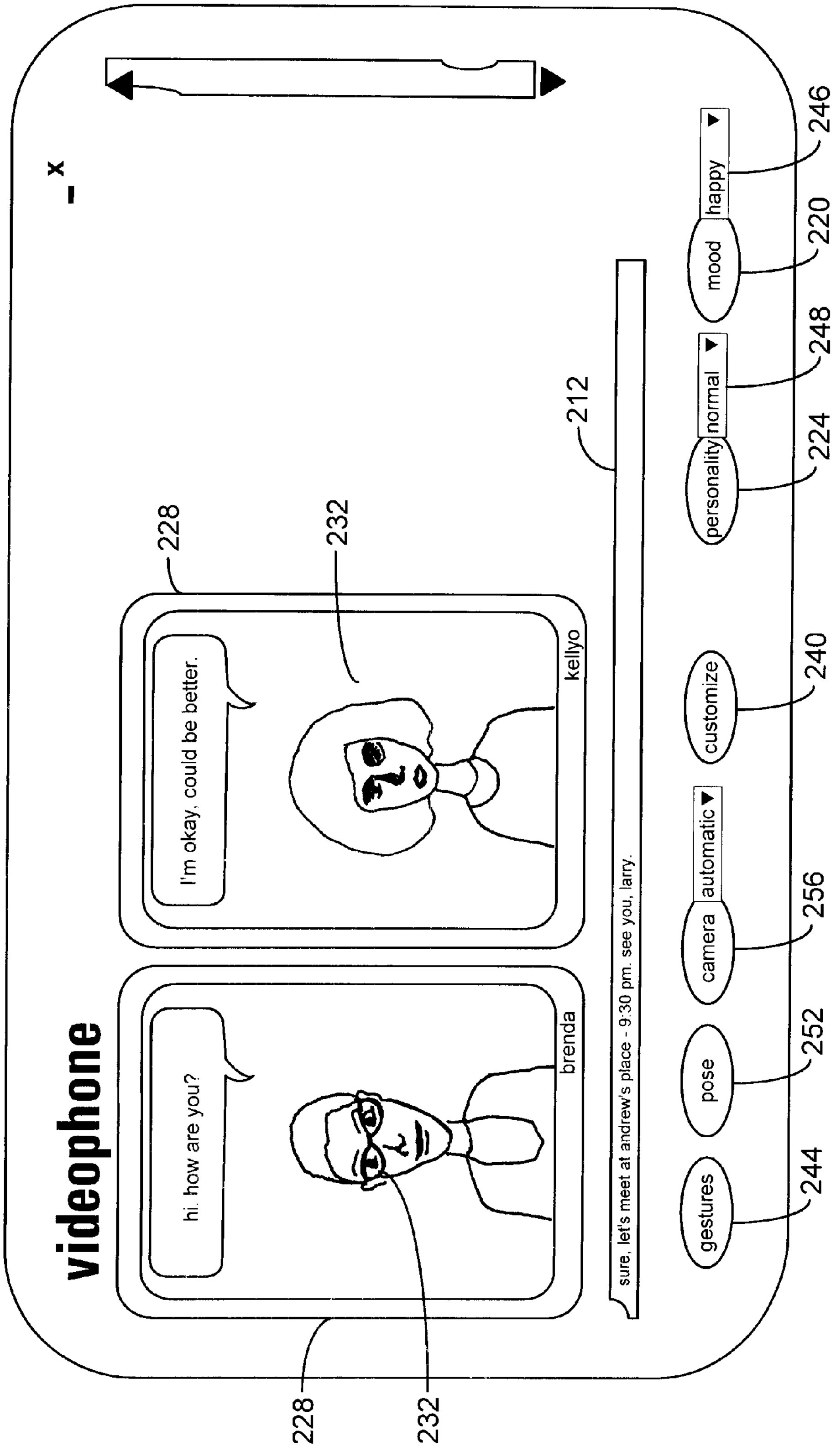
FIG. 2*b* is an alternate embodiment of a user interface for behavioral information communication.

FIG. 2*b* illustrates an alternate videophone user interface 200. In this embodiment, the current mood and personality settings are displayed next to the mood and personality boxes 224, 220 in text windows 248. Also, a camera tool 256 is provided to allow the user to alter the "camera angle" at which the visual representation 232 is seen, thus permitting close-ups or pull-backs to be displayed. A pose button 252 is displayed to allow the user to control the default pose of the visual representation 232 during the communication session.

Figure 3A:
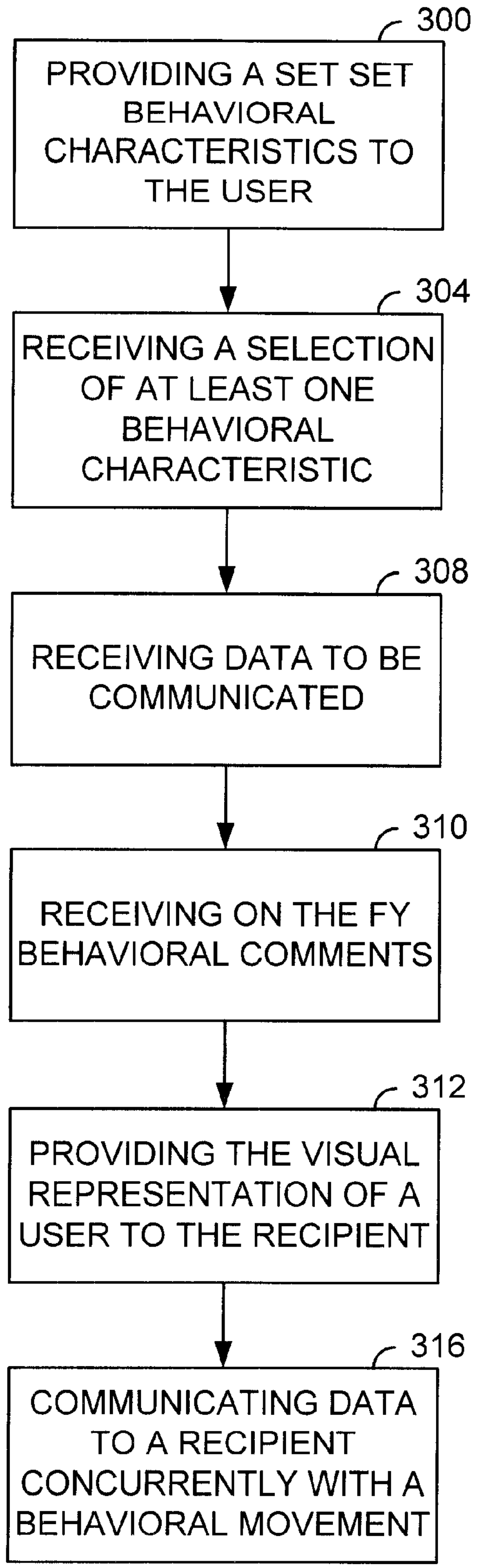
FIG. 3*a* is a flow chart illustrating a preferred embodiment of a method of communicating data to a recipient concurrently with a behavioral movement.
Figure 7:
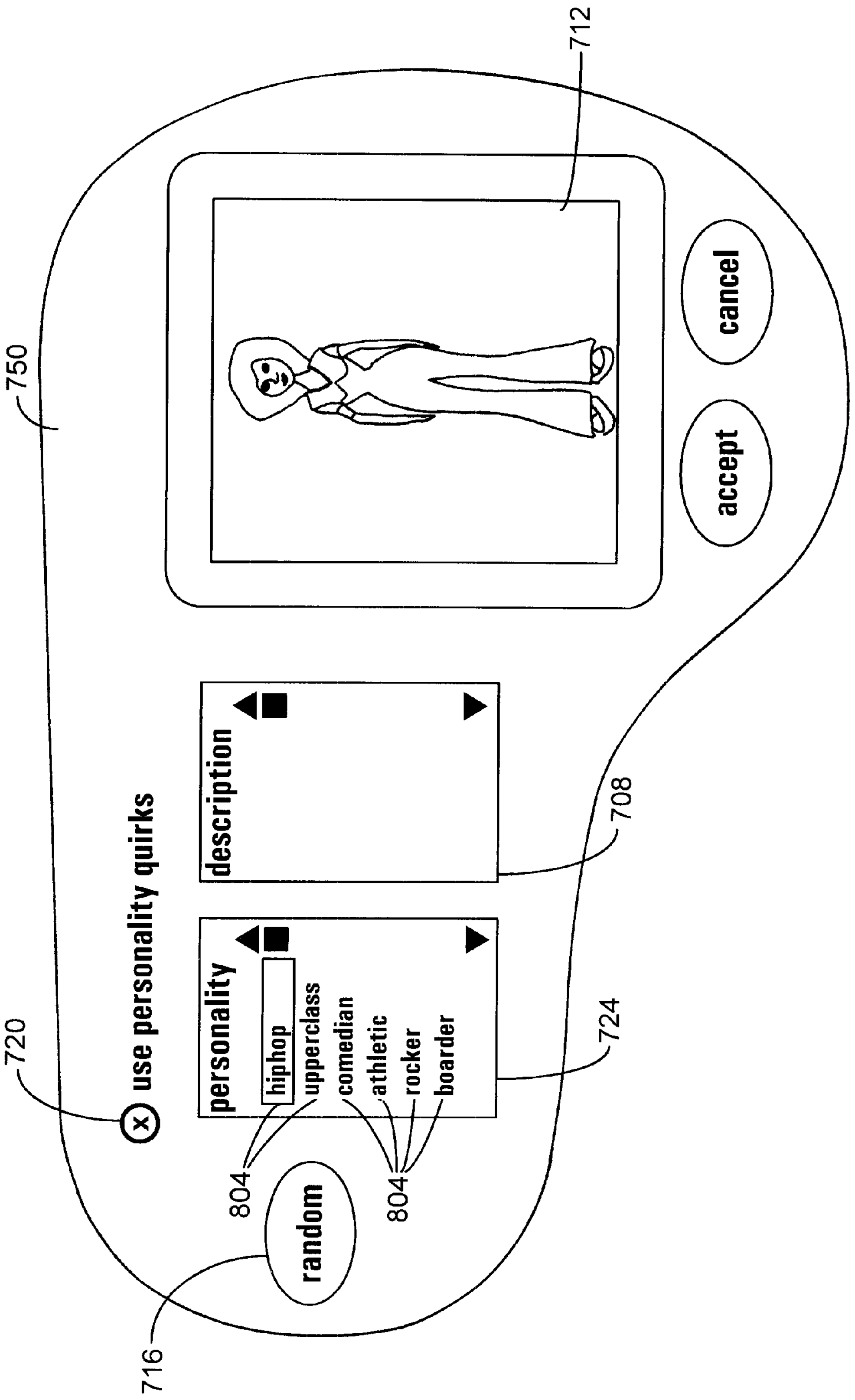
FIG. 7 is a screen shot illustrating an embodiment of a personality setting user interface.

FIG. 3*a* is a flow chart illustrating a preferred embodiment of a method of communicating data to a recipient concurrently with a behavioral movement in accordance with the present invention. The user 100(1) is provided 300 a set of behavioral characteristics to select for the user's visual representation 232. Behavioral characteristics include personality types, and mood settings. The personality types include personalities such as "outgoing," "intellectual," "introverted," "athletic," or other similar types. The mood settings can adjust a personality from being intensively aggressive to cheerful. The personality types are displayed after selecting the personality box 224 as shown in FIG. 7. The mood settings can be selected by the mood tool 220, shown in FIG. 2 and described in more detail with respect to FIGS. 9*a* and 9*b*.

The user 100(1) selects a behavioral characteristic or characteristics to be associated with the user's visual representation 232, from the behavioral characteristics displayed, as shown in FIG. 7. The selection is received 304 by the application module 120. Next, the application module 120 receives 308 the data to be communicated to the recipient 100(2). The data is typically text, but can include information in other media.

The visual representation 232 of the user 100(1) is then provided 312 to the user 100(1) and the recipient 100(2). In conventional systems, text to be communicated is transmitted without any behavioral information to provide context, and thus the communication between user 100(1) and recipient 100(2) is stripped of valuable behavioral information. In accordance with the present invention, however, the application module 120 communicates 316 the data to the recipient 100(2) concurrently with a behavioral movement of the visual representation 232 associated with the selected behavioral characteristic, where the behavioral movement provides an emotional context to the recipient 100(2) for interpreting the communicated data. The behavioral movement is the manifestation of the behavioral information conveyed by the user 100 through the selection of behavioral characteristics, through providing explicit behavioral commands, or through the choice of specific text in the data string. Upon viewing the behavioral movement of the user's visual representation, the recipient 100(2) can interpret the data communicated by the user 100(1) within an emotional context.

For example, if the sender chooses an extrovert personality type, with a positive mood setting, the recipient will see the text animated with big hard motions, smiles and lots of movement. Then, if the sender sends a message such as "I think she likes me" with this setting, the recipient will get a sense that the sender is very enthusiastic about the person referred to. The sender's behavioral information is thus communicated to the recipient through the behavioral movements of the visual representation 232, providing an emotional context to view the text sent by the sender. Alternatively, if the user selects a negative mood setting, the visual representation 232 has depressed facial movements such as frowns and downcast eyes, and body movements like shuffling feet. If a sender then says a message, "I don't know how I did on the test," a head shake corresponding to the "I don't know" is selected corresponding to the negative mood setting; and the recipient knows that the sender is not optimistic about the results. Of course, the emotions communicated may not reflect the sender's actual emotions, as the sender can choose any personality or mood setting and have that choice of behavioral characteristic communicated to the recipient. Thus, the present invention allows people to, just as they would in the actual world, "put on a happy face," and also allows them to adopt different moods and personalities for fun. For whatever the reason the user selects behavioral characteristics, the present invention conveys that selection through the appropriate behavioral movements.

In one embodiment, the selection of behavioral characteristics includes receiving 310 selection of on-the-fly behavioral information from the user 100(1) to communicate to the recipient 100(2). The on-the-fly behavioral information is communicated as specific behavioral commands such as gesture commands, specific mood settings, personality settings, or through the analysis of the content of the text communication of the utterance. For example, a disclosure may be: "Hello Tom (wink)," "How are you today (smile)," "How's life in the salt mines at ACME Corp.? (RASPBERRY)." The gesture commands (wink), (smile), (raspberry) cause the user's visual representation 232 to act out the command to emphasize the text and provide additional behavioral information.

In a preferred embodiment, discussed in detail below, the text communicated by the sender is analyzed for its content, and behavioral movements associated with the content are selected, also responsive to the user's selected behavioral characteristics. For example, if the sender types in the utterance "You're a big loser", the application module recognize the use of a xenocentric word ("you") and a volumetric word" ("big"). The behavioral movements associated with xenocentric and volumetric words are selected to animate the sender's visual representation 232. However, the specific behavioral movements selected are chosen responsive to the sender's personality and mood settings. For example, if the sender has selected a "hiphop" personality, and a positive mood setting, the visual representation 232 is animated with a big point toward the user, big facial movements tracking an exaggerated "you", large hand separation to show "big", and a smile to show the communication is not meant to be taken seriously. Thus, by analyzing the text of the utterances, more relevant behavioral movements are selected to communicate the sender's behavioral information.

As discussed above, behavioral movement information, comprising instructions for performing the behavioral movement, are transmitted to the application module 120 residing on the recipient's computer 108(2), which translates the behavioral movement information into behavioral movements. The behavioral movement information is preferably sent as part of a choreography sequence which is a specific format for transmitting the behavioral movement information specifying the timing and order of the movements to be performed, and providing links to the movements themselves which are stored on the recipient's computer 108. Alternatively, in an embodiment where the animation sequences themselves are not stored on the recipient's computer, the behavioral movements themselves are transmitted to the recipient's computer 108, which then merely reproduces the movements on the recipient's display.

Figure 3B:
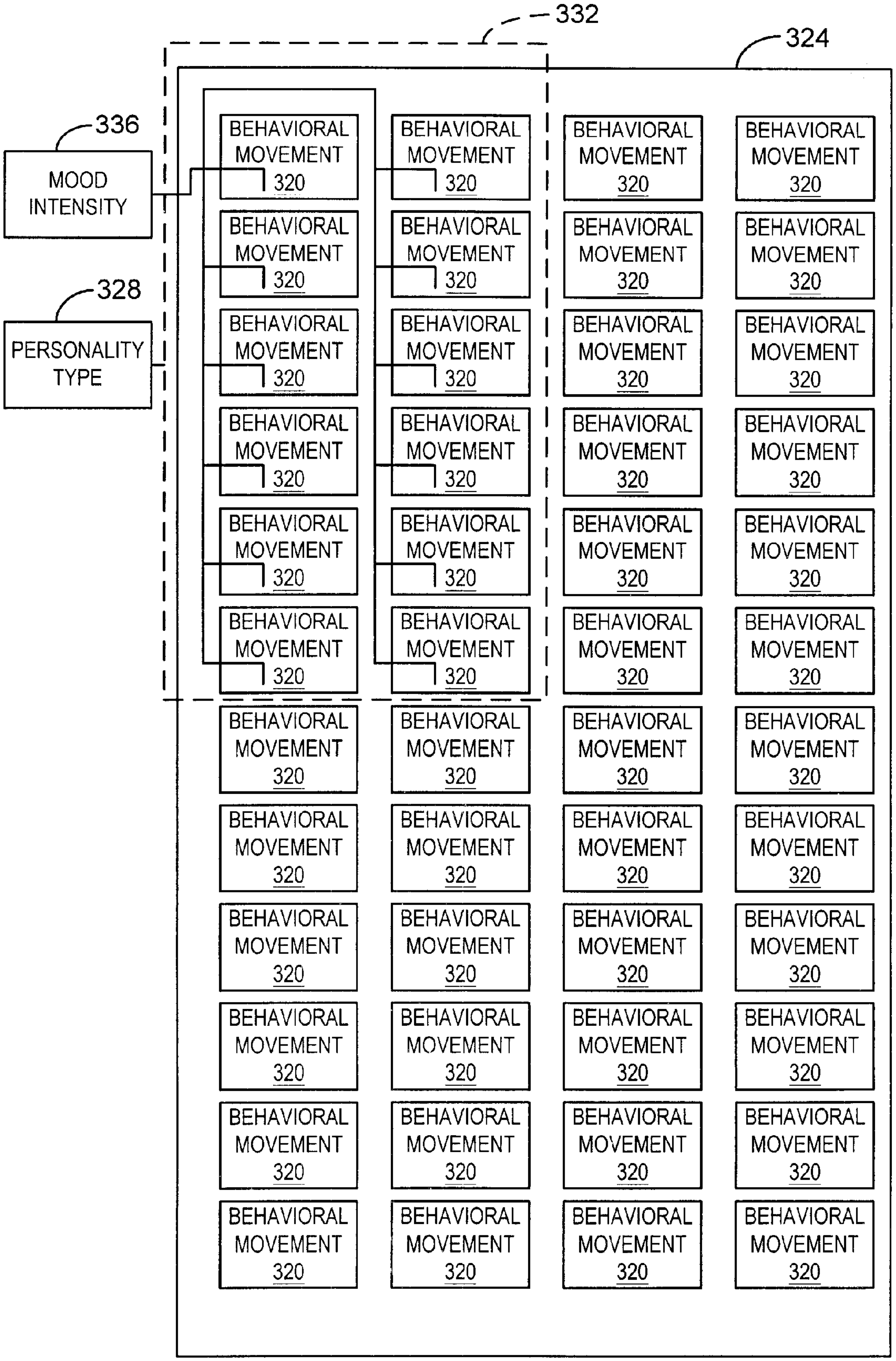
FIG. 3*b* is a block diagram illustrating the relationship between personality types, mood intensity and behavioral movements.

As shown in FIG. 3*b*, behavioral movements 320 are preferably selected from a library 324 of behavioral movements 320 provided to the application module 120. Selection of a behavioral movement 320 with which to animate a visual representation 232 is determined by the user's selection of behavioral characteristics. In the preferred embodiment the selection of a personality type 328 selects a subset 332 of behavioral movements 320 from the library 324. Selection of a mood intensity setting 336 sets weights for each behavioral movement 320 in the subset 332 and thereby determines the probability of selection of a particular behavioral movement 320. The specific weights defined by each mood intensity setting in combination with a personality type 328 selection are preset by the application module 120. Thus, in operation, when the application module 120 is required to select a behavioral movement 320, for example, if the sender types in a phrase such as "Hello," of the several behavioral movements 320 in the library 324 associated with "Hello", the behavioral movement 320 associated with the phrase "Hello" by the selection of the personality type 328 and given the highest weight by the selected mood intensity 336 is selected by the application module 120. For example, if the sender selected an introverted personality type 328 with a low mood intensity setting 336, a small shake of the hand behavioral movement 320 is selected, thus communicating the depressed state selected by the sender. If the personality type 328 is extroverted, and the mood setting 336 is high, the phrase 'Hello' evokes a big wave and a smile facial behavioral movement 320. Thus, selection of a behavioral characteristic by the sender determines the behavioral movement animated by the user's visual representation 232, and thus communicates valuable behavioral information to the recipient.

Figure 4A:
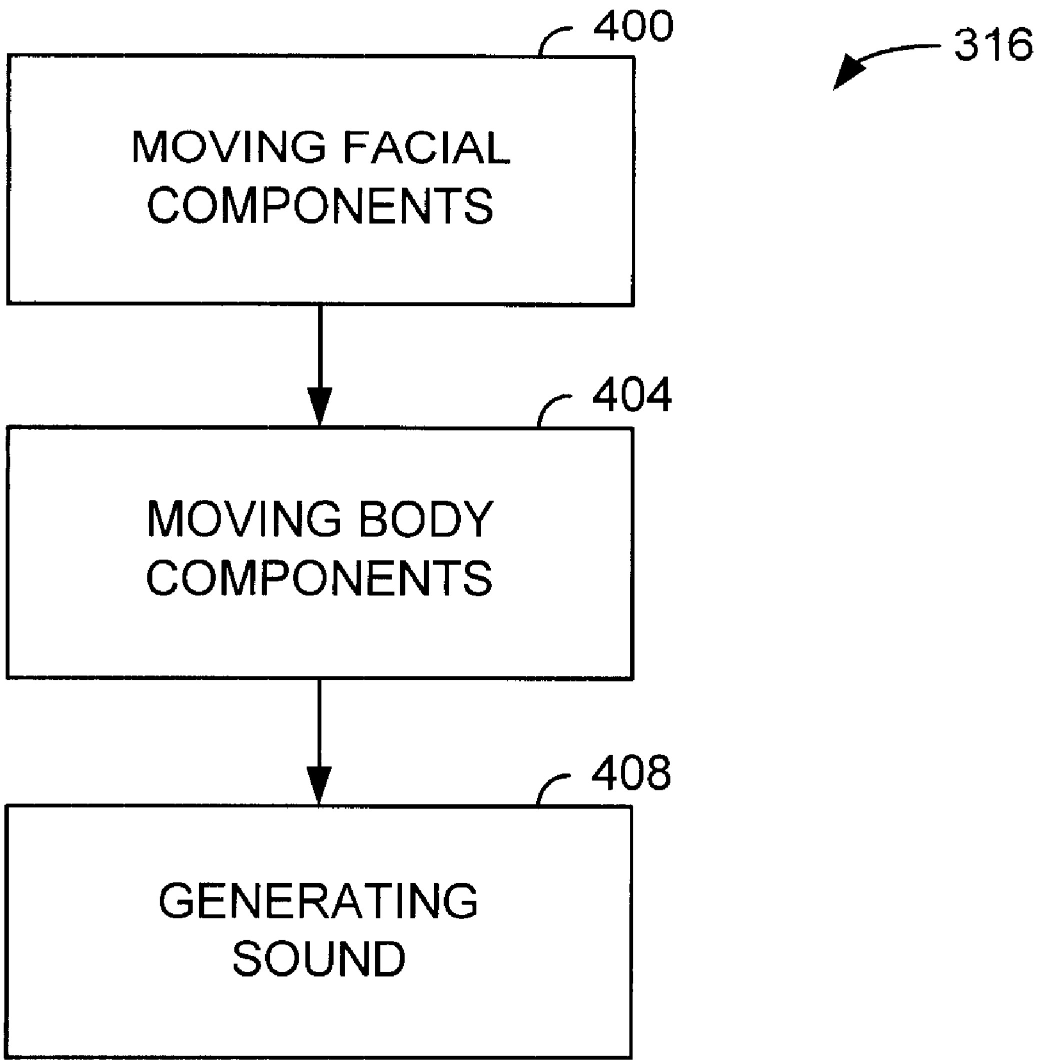
FIG. 4*a* is a flow chart illustrating an alternate embodiment of a more detailed method of communicating data to a recipient concurrently with a behavioral movement.

FIG. 4*a* is a flow chart illustrating a method of communicating data to a recipient concurrently with a behavioral movement 320 in accordance with the present invention. A behavioral movement 320 comprises an animation primitive or sequence file that animates the visual representation 232 when executed. In one embodiment, behavioral movements 320 also include sound effect files. The movements 320 themselves are preferably accomplished through the animation of skeletons underlying the visual representations 232. In one embodiment, there is one skeleton for each male and female visual representations consisting of 42 bones (plus 3 additional bones for hair movement). The head and body are animated separately and synthesized at run-time. This provides for independent control of the head and body of the visual representation 232. Other methods of animating a visual representation 232 are considered to be within the scope of the present invention.

In accordance with FIG. 4*a*, a behavioral movement 320 is an animation 400 of the facial components of the visual representation 232. The behavioral movements 320 of a facial component of a visual representation 232 include smiles, frowns, glares, winks, raising of an eyebrow (to express incredulity), yawning, rolling eyes, or any other facial expression that can be animated to provide context to a data communication. Additionally, the facial components can simulate speaking the written text, utilizing the synchronization of dialogue or text display and facial speaking movements 320. In this embodiment, the facial animation of the speaking visual representation 232 mimics the articulatory gestures of a human speaker through known text-to-phoneme processing techniques.

The body components of the visual representation are also animated 404 as appropriate to behavioral characteristics as commands. Body behavioral movements 320 can include shaking a fist, waving, fidgeting (perhaps to show boredom), tossing a coin, snapping fingers, large hand sweeping movements 320 to show high emotions, and other body movements that can be animated to provide context to a data communication.

Finally, the application module of the recipient generates 408 sound or audio clips as a behavioral movement 320 response to the sender's choreography sequence to provide further context for the data communication. Sound clips include laughter or clapping to accompany facial and body movements. Sound clips can provide independent contextual information through exclamations such as "ooh," "aah," "wow," "ow" or the like. Other audio clips may also be played during the communication of the data to provide contextual information, such as different types of laughter, or raspberries, or sobbing.

Figure 4B:
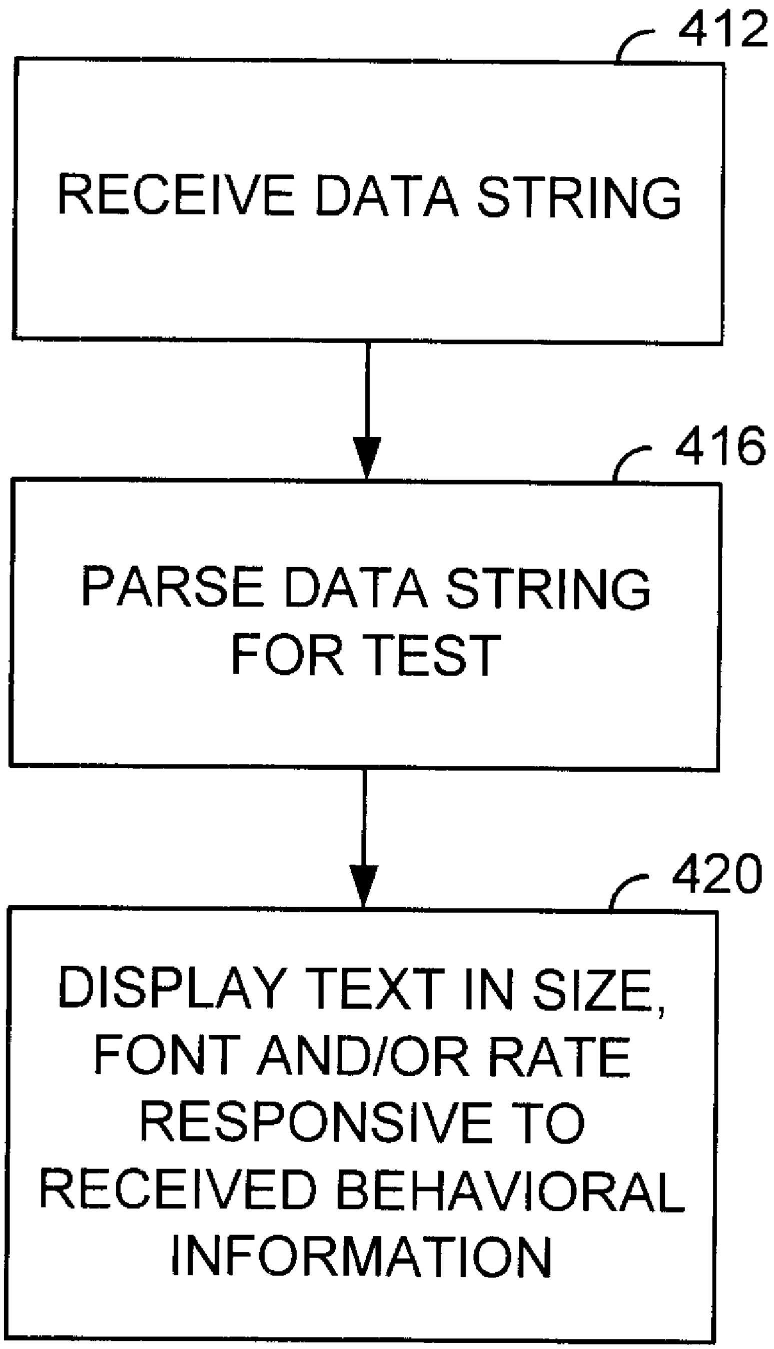
FIG. 4*b* is a flow chart illustrating displaying text responsive to received behavioral information.

FIG. 4*b* illustrates a method of displaying text in accordance with selected behavioral characteristics to further communicate behavioral information to a remote recipient 100(2). The text is analyzed by the sender's application module 120, and then the modified text is transmitted to the recipient. First, a text string is received 412. Next, the text string is parsed 416 for text. Parsing is accomplished using a conventional parsing methodology as is known to those of ordinary skill in the art. Then, the text is displayed 420 to the recipient in a size, font, and/or rate responsive to the received behavioral information. For example, if the user 100 selects an intense mood intensity, text may be displayed on the screen at a fast rate, or in a large font size, or in a bold typeface in a particular font. If the user 100 selects a more relaxed intensity, the text may be displayed more slowly, in a smaller size, and in normal typeface, with a different font (e.g., italic).

The display of text can also be controlled by the selection of behavioral characteristics, such as personality settings, by behavioral commands such as gestures, or by the content of the data string, by examining the text for predefined phrases, or other indicators. For example, if a sender chooses an introverted personality with a depressed mood setting, the text is displayed in small plain font and at a slow rate. If an exclamation point is used, the sentence is displayed in all capital letters in a different color, such as red, to indicate excitement. Thus, this display of the text communicates the mood of the sender, providing the recipient with the emotional context with which to interpret the information. Finally, the application module 120 can display text responsive to a general flow of a communication session. Thus, if users 100 are quickly typing and sending messages, the text can reflect the more frantic pace of communication, for example, by being displayed cramped together and in a smaller font size, and if the messages are created more slowly and thoughtfully, this behavioral information can be communicated through the rate and appearance of the text as well, for example, with more spacing between the words and in a larger font size.

Figure 5:
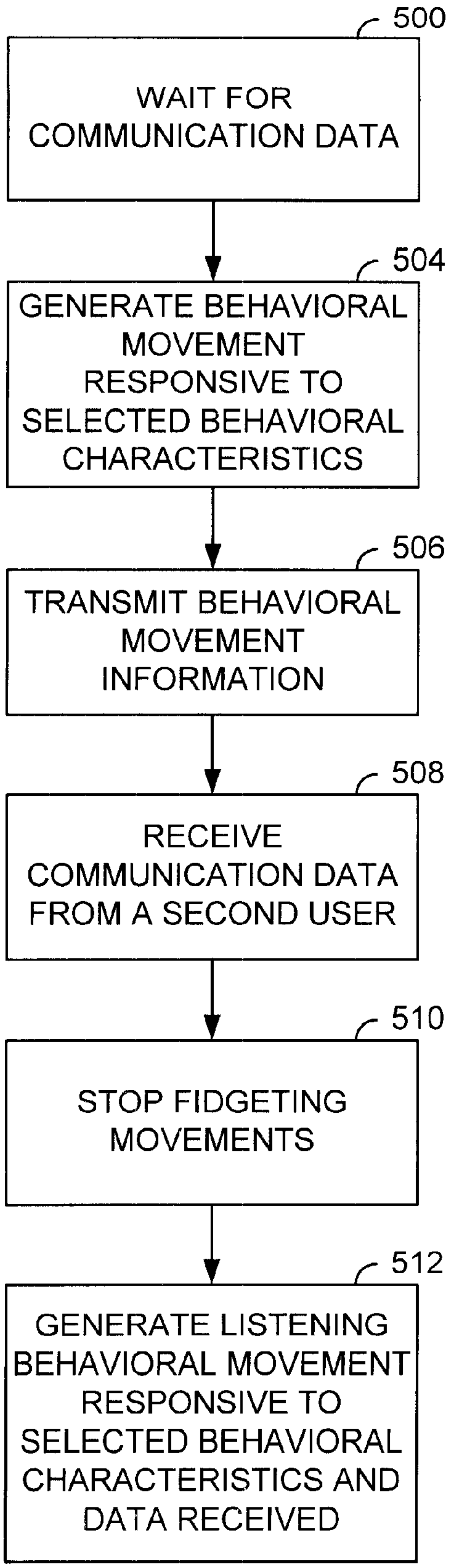
FIG. 5 is a flow chart illustrating communicating data to a recipient concurrently with a behavioral movement responsive to alternate communication states.

FIG. 5 is a flow chart illustrating communicating a behavioral movement 320 responsive to alternate communication states. In these states, behavioral information is conveyed to a recipient 100(2) without transmitting text data. In the preferred embodiment, there are three states: acting, listening, and fidgeting. Acting refers to the state when the visual representation 232 is either talking or gesturing, as described above in connection with FIG. 3. For either talking or gesturing, the behavioral movement 320 of a visual representation 232 is a result of explicit actions by the user 100.

For the listening state, whenever another user 100 is acting (talking or gesturing) the user's visual representation 232 appears attentive; however, the degree of attentiveness is a function of the personality type 328 or other behavioral characteristic selected by the user 100. In general, these movements 320 reflect listening movements, for example, when text is received, the visual representation 232 nods occasionally or otherwise indicates that it is 'following' the oration. The fidgeting state refers to a state in which the user's visual representation 232 is neither acting nor listening. In this state as well, the behavioral movements 320 of the visual representation 232 are selected responsive to the selected personality 328 or other behavioral characteristic of the visual representation 232. How the visual representation 232 acts in an idle state is therefore a function of the behavioral characteristics selected by the user 100. Fidgeting can include having the visual representation 232 sway or blink, or perform more complicated animations reflective of the selected behavioral characteristic such as cleaning the 'glass' of the window 228 containing the visual representation 232 (if the personality type 328 selected is, for example, a "comedian" personality).

As only one state can exist at a time, in accordance with the present invention, the acting state is set at a higher priority than the listening state, and the fidgeting state is given the least priority. Thus, upon receipt of a communication from a user and a second user, the visual representation 232 will be placed in the acting state. If the user's visual representation 232 is in the fidgeting state, and a communication is received, the visual representation 232 will be placed in the listening state.

As illustrated in FIG. 5, the default state of the application module 120 is awaiting 500 communication data from any user 100. Responsive to receiving no communication data, the application module generates 504 a choreography sequence responsive to the selected behavioral characteristics for the visual representation 232. The choreography sequence is transmitted 506 to the recipients' 100(2), who then view the user's visual representation's behavioral movements 320 after interpreting the received choreography sequence The behavioral movement 320 thus conveys behavioral information regarding the user 100 without requiring the transmission of explicit data. Upon receipt 508 of communication data from a second user 100, the fidgeting movements are stopped 510 and the user's 100 application module generates 512 a listening state choreography sequence responsive to the selected behavioral characteristics. The choreography sequence is transmitted to the recipients' computers 108, who then can view the listening behavioral movements 320 of the user's visual representation 232 to understand the current state of the user 100, for example, whether the user 100 is attentive, or is bored, etc.

Figure 6:
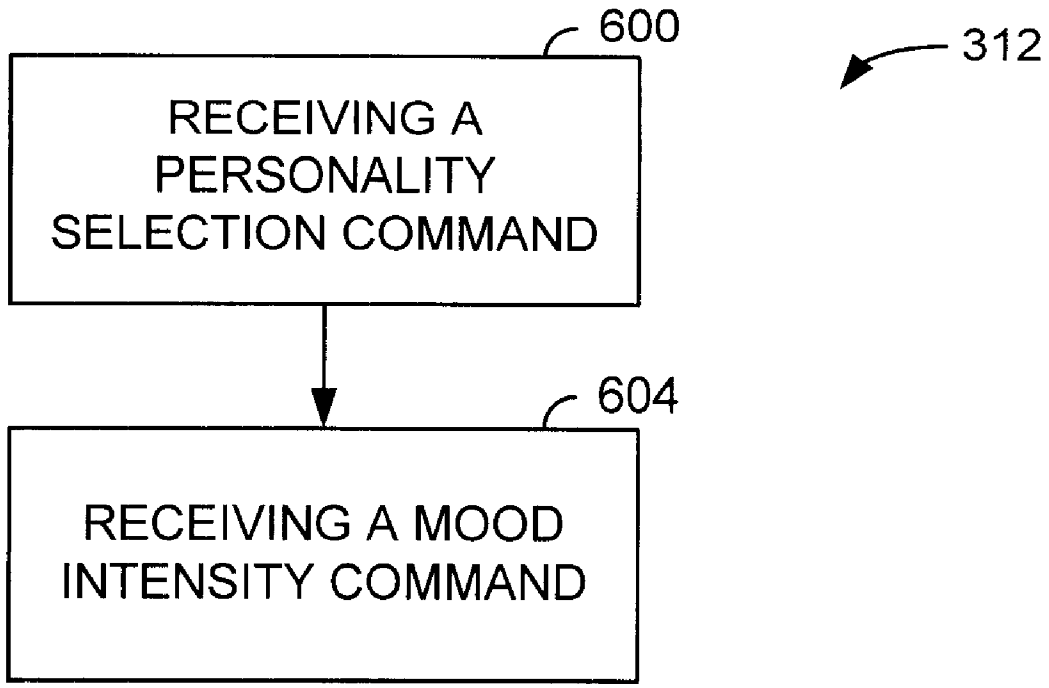
FIG. 6 is a flow chart illustrating a preferred embodiment of a more detailed method of receiving an initial selection of a behavioral characteristic.

FIG. 6 is a flow chart illustrating a preferred embodiment of a more detailed method of receiving an initial selection of a behavioral characteristic in accordance with the present invention. In this embodiment, the application module receives 600 a personality selection command from a user 100 to select a personality type 328 for the visual representation 232 and receives 604 a mood intensity command that selects a mood intensity 336 for the personality type 328 selected. These selections are received at an initial set-up of the visual representation 232 to determine an overall context for communications transmitted by the user 100. However, during specific communication settings, the personality and mood settings can be changed to provide a specific context for a particular communication.

FIG. 7 illustrates a personality settings interface 750 for selecting a personality type 328. This window is displayed to the user 100 after selecting the personality box 224 from the main interface 200. A personality type 328 is the encapsulation of everything required to drive the visual representation's behavior in accordance with the selected behavioral characteristics. As such, the personality type 328 is associated with behavioral movements 320 for talking, gesturing, listening, and fidgeting movements that may be specific to the personality 328. For example, a cynical personality is associated with facial movements such as raised eyebrows, and body movements such as folded arms, and a comedian personality has smiles weighted more heavily for selection, and has hand motions selected more often during communication.

Figure 8:
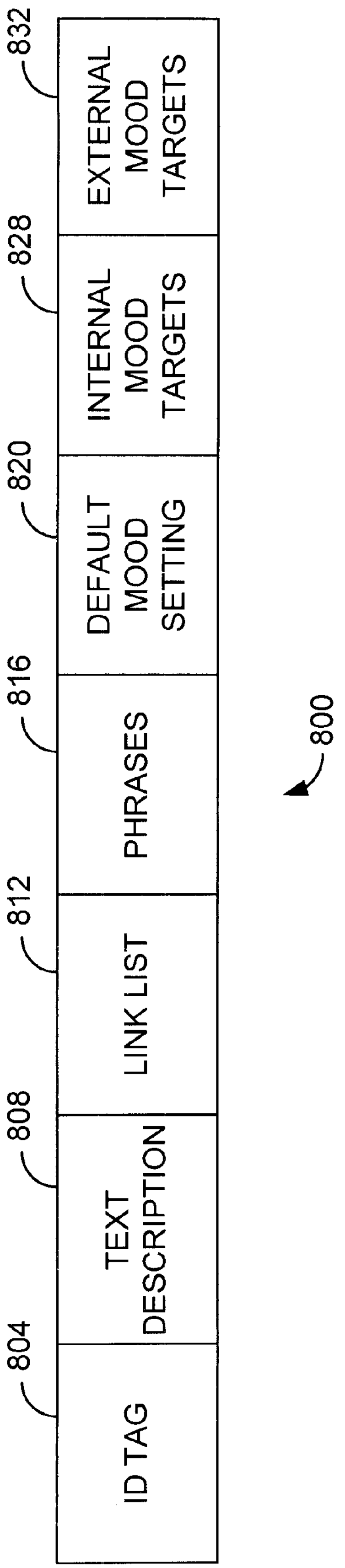
FIG. 8 is a block diagram illustrating a personality data file.

In a preferred embodiment, as shown in FIG. 8, personality types 328 are maintained as a single data file 800 containing an identification tag 804 for the personality (a descriptive adjectival phrase used in the selection menu 724 of the personality selection screen 700), a text description 808 of the personality (used in the personality selection screen 724), links 812 to behavioral movements 320 for talking, gesturing, listening, and fidgeting, with weightings that. describe the personality's propensity to perform a particular behavioral movement 320 given different mood intensity settings 336, a lexicon 816 of phrases which the personality 328 is responsive to and links to the behavioral movements 320 that those phrases elicit, a default mood intensity setting 820, mood intensity targets 828 for active and dormant usage, and mood intensity targets 832 used in reaction to other characters' mood intensities. After a personality type 328 has been selected, the personality data file 800 associated with the personality type 328 is stored either on the user's computer 108, the network server 112, or both. The personality file 800 thus contains information about which behavioral movements 320 to use in which context (talking, fidgeting, listening, gesturing, or in connection with natural language processing). The personality file 800 also uses the weightings set by the mood intensity setting 336 to determine how to use the behavioral movements 320 associated with the personality type 328.

Referring to FIG. 7, the personality setting screen 750 and functionality is implemented as a Microsoft Windows 95 MFC application; however, other implementations known to those of ordinary skill in the art are within the scope of the present invention. This function is accessed automatically when the user first initiates a product in accordance with the present invention and also from a preferences menu of the system. Once invoked, the user is preferably presented with the following interface:

- A scrollable menu 724 of possible personality selections. These items are adjectival phrases 804 which describe the personality type 328.
- A scrollable text box 708 for displaying the written description 808 of a personality.
- A render view window 712 depicting the user's visual representation 232 in different personality types.
- A Random button 716 for randomly selecting a personality type 328.
- A check-box indicator 720 for toggling use of personality quirks.

Upon invoking the personality selection screen, the interface may indicate that no personality type 328 is selected (i.e., when the user first uses the product), and then:

- The menu 724 of personality selections contains no highlighted item.
- The personality type 328 description box 708 is empty.
- The personality quirks check-box 720 is blank.
- The view window 712 depicts the visual representation 232 standing statically.

If a personality type 328 has been previously selected, then:

- The currently established personality type 328 (i.e., that which the user has previously saved) is displayed.
- The menu 724 of personality selections is scrolled so that the currently established personality type 328 is highlighted.
- The personality description box 708 contains the written description 808 of the personality type 328.
- The personality quirks check-box 720 is set to either blank or checked depending on what it was set to when the user 100 previously established the selection.
- The view window 712 depicts the user's visual representation 232 animated in fidget mode.

A personality type 328 may be selected by selecting an entry in the personality selection menu 724. Upon selection, the selected item 328 in the menu 724 of personalities is highlighted, a written description 808 of the personality type 328 is placed in the text window 708, and the view window 712 depicts the user's visual representation 232 is animated in the selected personality's fidget mode, which reflects behavioral movements 320 associated with the selected personality 328. The menu description 808 is intended to be a short, descriptive adjectival phrase (e.g., "anxiety prone intellectual"). More information regarding the personality type 328 is provided to the user 100 through selection of a personality type 328.

In one embodiment, an utterance override is generated by selecting a personality type 328 from within a communication session by entering in a specific personality type 328 in an utterance, with demarcating symbols, for example, by typing in "(flamboyant") within an utterance. The override pertains only to the interactions of the current session and are not persisted, therefore affecting neither other currently active sessions nor future sessions. Alternatively, the user 100 can select the personality type override to affect a single utterance within a communication session. To set an override, an override button is selected and a personality bar is displayed to provide the single communication session or single utterance override. The personality bar is preferably a pull down menu 248 containing the list of available personality types 328, as shown in FIG. 2*b*, any one of which the user 100 may select. Upon selection, the visual representation 232 acts in accordance with the behavioral movements 320 associated with the newly selected personality type 328 for the session or utterance, as designated, and then the visual representation 232 reverts back to acting in accordance with the default setting after the session or utterance has terminated. Thus, the user 100 is given the flexibility to transmit session or utterance specific behavioral information for a specific session or utterance.

Figure 9A:
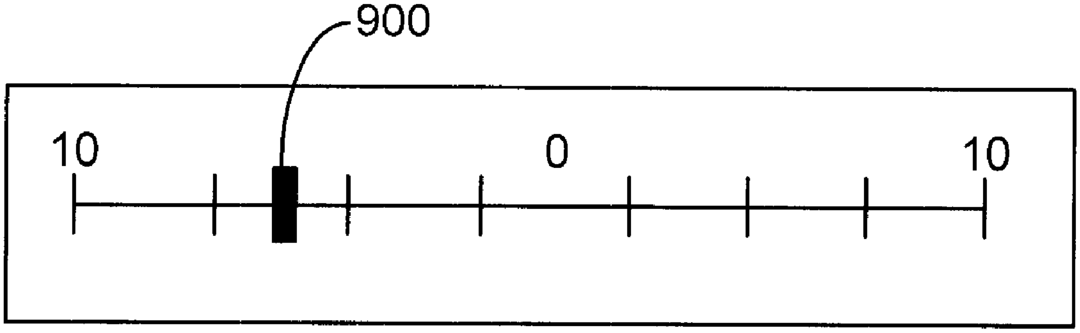
FIG. 9*a* is a screen shot illustrating an embodiment of a mood setting user interface.

FIG. 9*a* illustrates a mood intensity setting interface 220 which is typically displayed in the main screen 200. As illustrated in FIG. 9*a*, the mood intensity setting interface 220 displays a sliding bar 900 which allows the user 100 to set an intensity value 336, or a mood field, for the mood of the visual representation 232. The user 100 sets mood intensity values 336 for the visual representation 232 by sliding the mood intensity setting bar 900. In a preferred embodiment, mood intensity values 336 are integers that fall in the range −10 (intensely aggressive) to 10 (intensely positive), with 0 indicating indifference. The mood intensity setting 336 selected by the user 100 is the mood intensity that the visual representation 232 adopts upon initiation of a remote communication. These mood intensity settings 336 have a bearing on the body language (i.e., body movements) and facial settings (i.e., facial movements) of the visual representation 232, allowing the visual representations 232 to affect a wide spectrum of attitudes. The effects of mood intensity 336 on a personality type 328 are preset through use of the personality setting interface 728 and weightings described above.

The mood intensity slider 220 is implemented as a standard scroll bar. Users 100 may scroll to any setting or click anywhere on the slider to snap to the desired value 336. For mice adequately equipped, rolling the central button wheel adjusts the scroll bar (rolling down adjusts the bar to the left, rolling up adjusts the bar to the right).

In one embodiment, personality quirks are implemented to provide greater depth of personality information. Personality quirks are tendencies that the personality type 328 has with respect to a given mood intensity 336. In one preferred embodiment, quirks comprise specific behavioral movements 320 for a visual representation 232, and enabling the personality quirk check box 720 provides links to specific behavioral movements. For example, a quirk may be winking, shuffling feet, playing with hands, or other similar movements. Quirks are unique to a personality type 328, and therefore convey specific information regarding a personality. The personality quirk check-box 720 allows the user 100 to decide whether or not their visual representation 232 will utilize these tendencies.

Figure 9B:
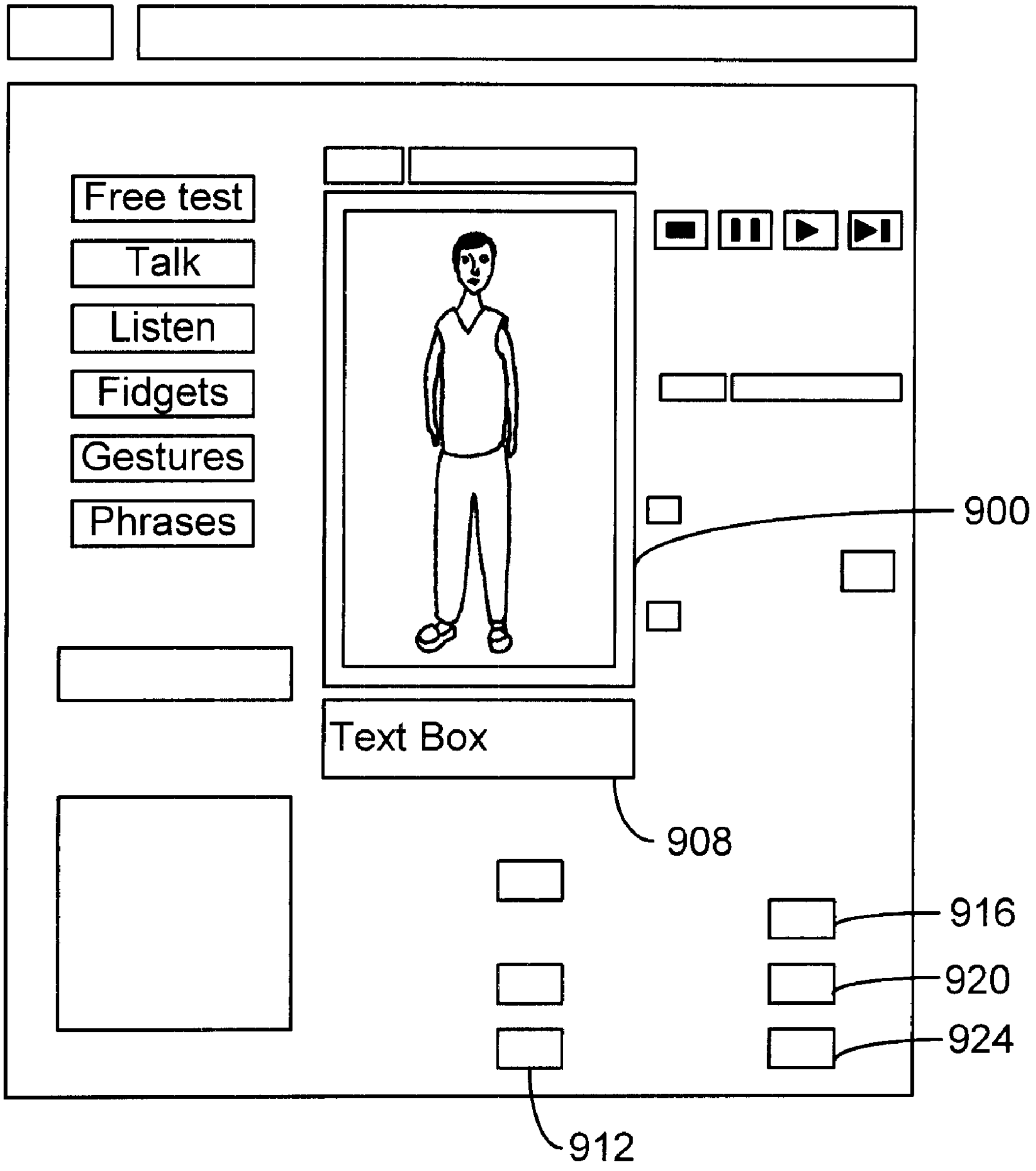
FIG. 9*b* is a screen shot illustrating a further embodiment of a mood-setting interface.

In a further embodiment, enabling personality quirks sets a first mood intensity 336 to which the personality 328 will incrementally approach when the user 100 is active (chatting frequently and in volume), and a second mood intensity 336 to which the personality 328 will incrementally approach when the user 100 is dormant. These quirks are implemented by setting the internal mood targets 828 of the personality file 800 to a desired value. As shown in FIG. 9*b*, dormant and active mood intensity targets 908, 912 are set in a personality file 800 to dynamically adjust the behavior of the visual representation 232 during a communication session. The interface 900 is preferably used by the application developer to assign the mood targets 824, 828 to a personality type 328. The activity mood intensity targets 908, 912 are the mood intensities 336 that the personality of the visual representation 232 incrementally approaches during a communication session. The shift in mood intensity 336 is based on the activity of the user 100, for example, based on the frequency and volume of chat in the communication session. Typically, visual representations 232 of inactive users 100 (those who chat little) will have their mood intensity 336 creeping towards the center of the mood intensity scale (indicating a fall off in intensity due to inactivity) while active users 100 will see a shift towards the positive intensity (right) end of the bar. While these propensities are true in the general case, the targets are arbitrary and may be set to any value for a particular personality.

Quirks also are used to control behavior of the visual representation 232 responsive to the mood intensity of other users 100 participating in a communication session. The quirks are implemented by setting values of the external mood intensity targets 832 to which the visual representation 232 will incrementally approach when interacting with other visual representations 232. As shown in FIG. 9*b*, reaction mood intensity targets 916, 920, 924 are used to establish mood intensities 336 that the personality of the visual representation 232 approaches based on the mood intensity 336 of the other user(s) 100 in the communication session. The application module sets the targets 916, 920, 924 based on user 100 input specifying median and pole mood intensity values. For example, a target of +5 as the median and 0 and +10 as the poles may be selected for the personality file 800. In this example, the user's visual representation 232 will creep to 0 if met with another user who is at −0, thus reflecting the mood of the other user, who is "bringing him down." Therefore, every visual representation 232 is, to a greater or lesser extent, influenced by the personalities 328 and mood settings 336 of the visual representations 232 with which they interact during a communication session.

Finally, an utterance override can be set by a user 100 to provide one-time mood intensity application during a particular communication session or utterance, similar to the personality type override described above. In this embodiment, during a communication session, the user 100 selects a pop-up mood intensity interface and adjusts the value of the pop-up mood intensity slider to the desired mood for this communication session. Alternatively, the user can type in a mood setting 336 directly, for example, by entering "(5)" prior to a text string. Responsive to this setting, the visual representation 232 alters its behavioral movements 320 to match the selected mood intensity 336 for the session or for the specific utterance. The changes in mood intensity 336 persists only for the single session or utterance, and does not affect the behavior of the user's visual representation 232 for other sessions, if a single session is selected, or throughout the communication session, if a single utterance is selected. Again, this allows the user 100(1) to communicate specific behavioral information to recipients 100(2) for a single session or utterance.

Figure 10A:
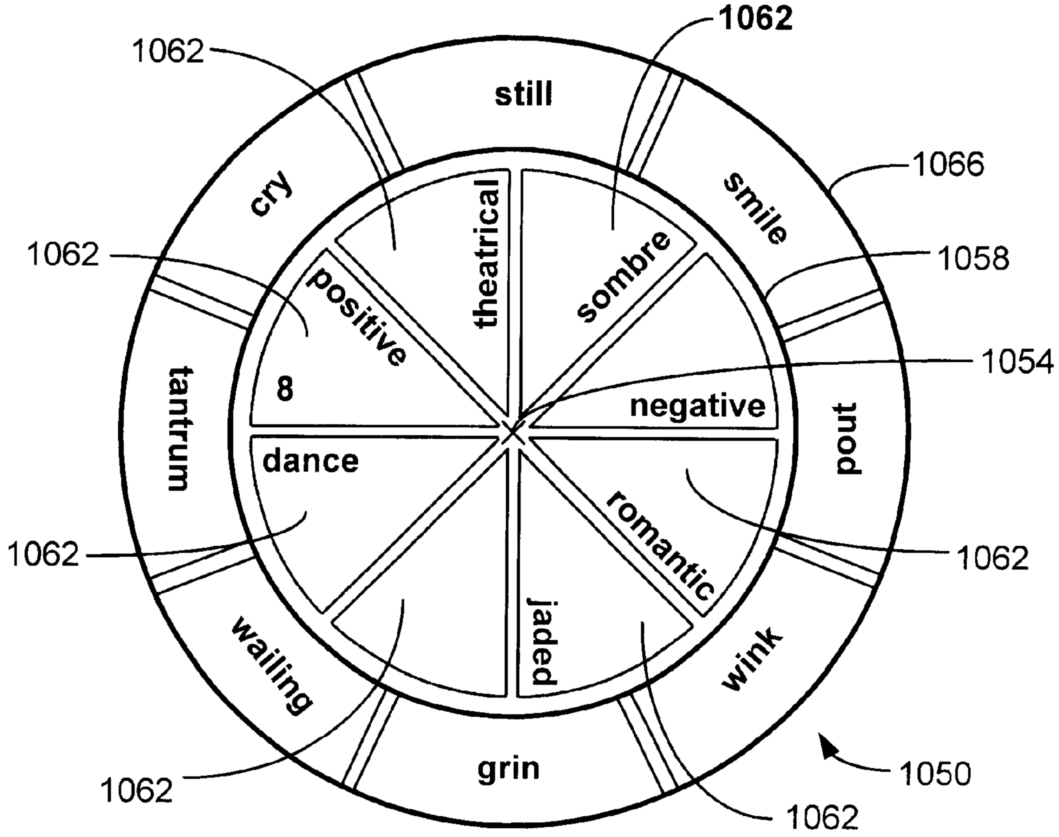
FIG. 10*a* is a screen shot illustrating a gesture wheel interface.
Figure 10B:
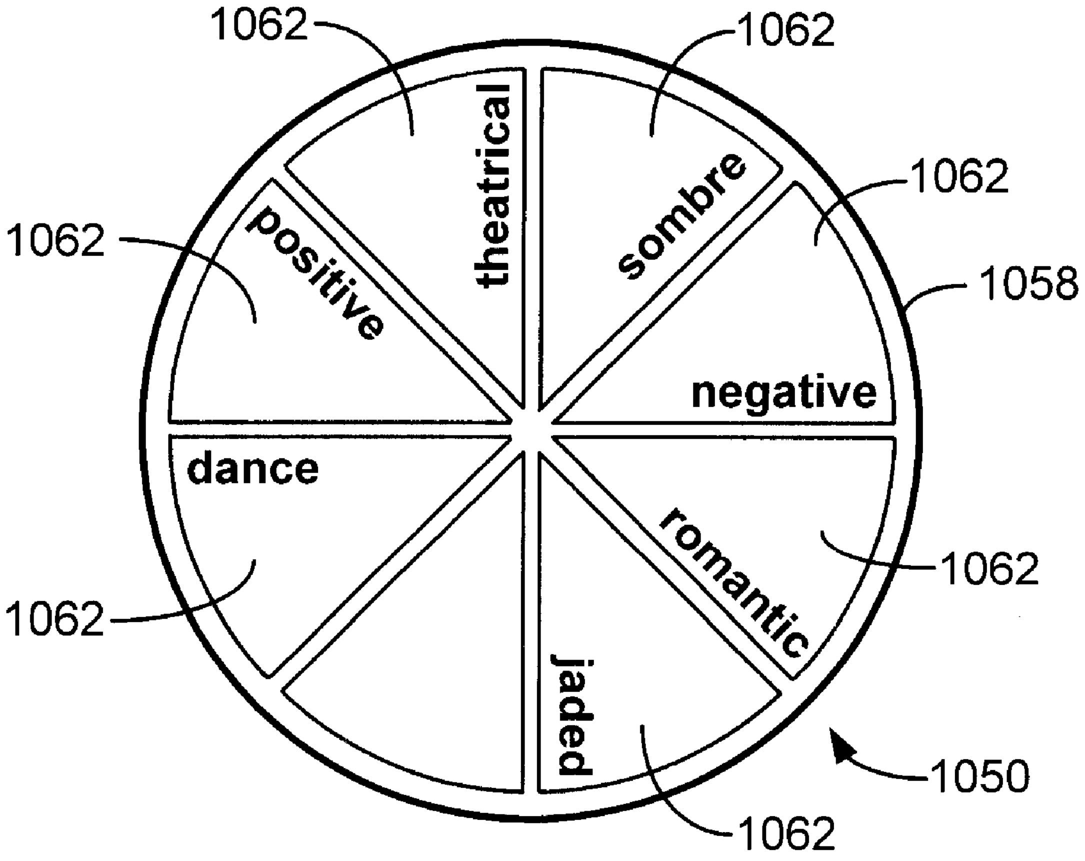
FIG. 10*b* is a screen shot illustrating a second view of the gesture wheel interface.

FIG. 10*a* illustrates the gesture wheel interface 1050, a graphical interface for selecting a desired gesture to correspond to the behavioral information the user 100 is attempting to convey. In FIG. 10*a*, the interface 1050 is shown as two wheels but any two concentric geometric shapes can be used. Upon invoking the gesture wheel interface 1050 by selecting the gesture button 244, the user's cursor is placed in the center of the wheel 1054, as shown in FIG. 10*b*. The inner wheel 1058 is divided into sections 1062 for the classes of gestures available. The outer wheel 1066 is blank at this point in the selection process. Moving the cursor outward through a section 1062 of the inner wheel 1058 identifies the class of gesture desired (e.g., Romantic versus Somber). Once the gesture-class has been determined, the outer wheel 1066 displays the specific gestures contained in that class as shown in FIG. 10*a*. Moving the cursor around the outer wheel 1066 and selecting a specific gesture indicates a selection of that gesture, resulting in the placing of an appropriate control marker into the outgoing chat edit box 212. Moving the cursor outside the outer wheel 1066 (with or without clicking) closes the gesture wheel interface 1050.

Figure 10C:
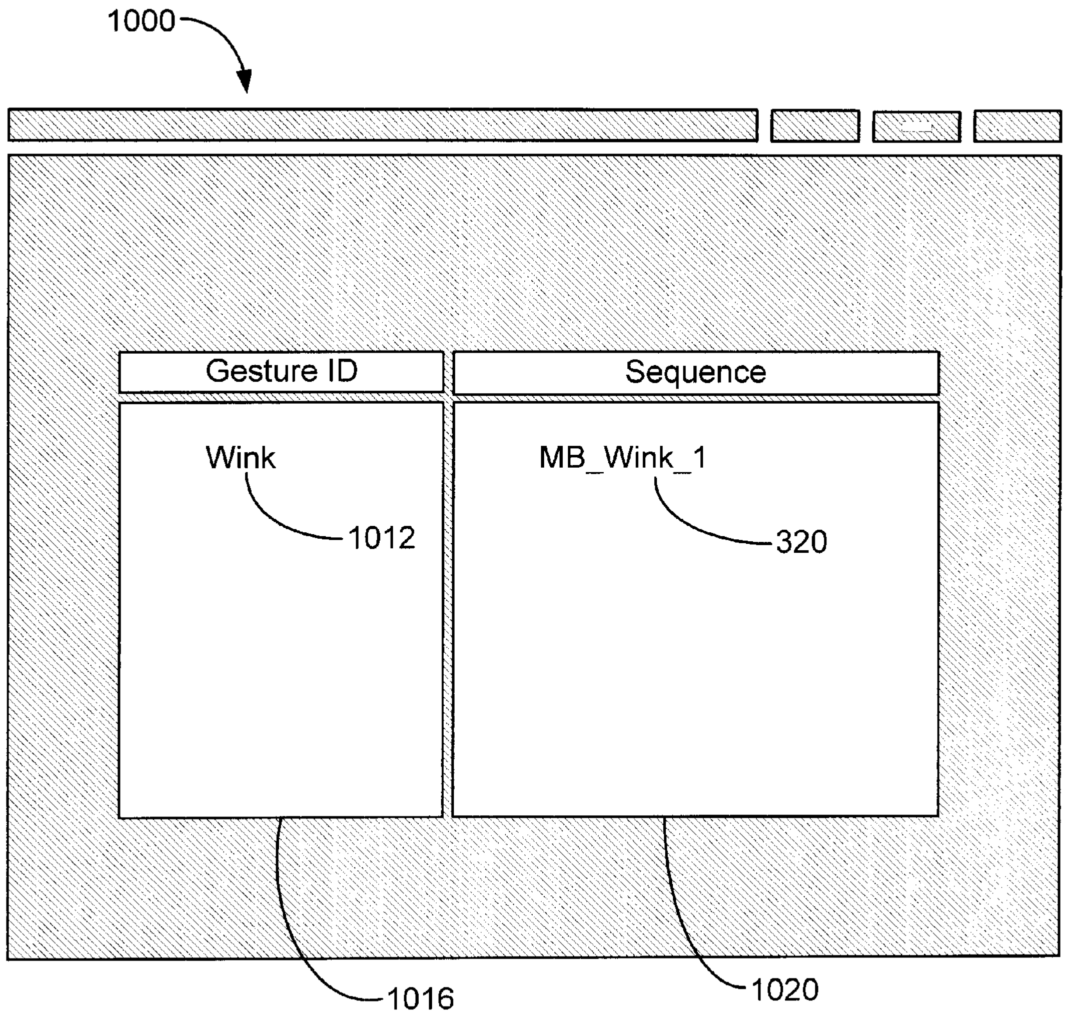
FIG. 10*c* is a screen shot illustrating an embodiment of a gesture-setting interface.

FIG. 10*c* illustrates a gesture definition interface 1000 used to create gestures by the application developers. Gestures may be predefined; alternatively, the user may define the gestures. A gesture is a specific type of behavioral movement 320 that communicates or punctuates a communication. Gestures run the gamut from waving to bowing to shaking a fist. Gestures are preferably organized into the following classes 1004: Romantic, Jaded (cynical or sarcastic), Dance, Positive (happy), Theatrical, Somber, and Negative (angry). Each gesture class 1004 has approximately a class of 8 specific behavioral movements 320 associated to it, which can be individually selected or selected by the application module 120 responsive to the user's personality selection. The classes are used to descriptively categorize the gestures for the user, to allow the user to make an easy and intuitive selection of a gesture in the gesture wheel 1050.

In one embodiment, content of a user's text string is analyzed to generate gestures. In this embodiment, words in the text string are analyzed to determine if predefined gesture trigger words are within the text string. Predefined gesture trigger words are descriptive action words that a user may or may not know are associated with a gesture behavioral movement. For example, if the user types in the words "wink" or "bow," the present invention recognizes the word and then executes the responsive behavioral movement 320. In a further embodiment, the selection of which behavioral movement 320 to execute is made responsive to the user's selection of behavioral characteristics.

In a preferred embodiment, gestures are given labels, called gesture IDs 1012. In one embodiment, the user 100 can insert a gesture 1012 to be performed by his or her visual representation 232 at any time during a communication session. The gesture behavioral movements 320 are preferably predefined, however, in an alternate embodiment, the user 100 is given the tools required to create custom behavioral movement gesture animation sequences. FIG. 10*c* shows a gesture ID 1012 linked to a behavioral movement 320.

As shown in FIG. 2*a*, the text edit box 212 located at the bottom of the chat display buffer allows the user 100 to input dialogue. Hitting <return> transmits the utterance (i.e., initiates the sending of a data communication to recipient). The utterance displayed in the edit box 212 is a combination of dialogue typed in by the user 100, gesture commands, and personality and/or mood intensity overrides. A user issues a gesture command by placing a gesture identification 1012 in the outgoing chat edit box. Once entered, the gesture identification 1012 is sent along with any dialogue (or other gestures or behavioral information, as discussed below) already present in the edit box. Upon reception, the recipient's computer 108 translates the gesture identification 1012 into a gesture behavioral movement 320, and the gesture behavioral movement 320 is executed by the user's visual representation 232 on the recipient's computer 108(2).

In one embodiment, the user does not have to know the gesture identification marker 1012 to identify a gesture. In this embodiment, the user 100 types '^' or a similar arbitrary symbol into the edit box. This signals that what is typed next is to be processed as a gesture. The user 100 then types the name 1012 of a gesture. As the user 100 types characters after the '^', pattern matching is performed to identify the complete gesture name 1012. The pattern matching uses a conventional technique such as regular expressions known to those of ordinary skill in the art. Once a gesture name 1012 has been inputted, the typed characters are converted to identify the appropriate gesture behavioral movement 320. Alternatively, hotkeys can be used to identify a gesture to be communicated to a recipient 100(2).

To create the sequence of movements 320 which form a gesture, the gesture definition interface 1000 is accessed. A gesture editing panel 1016 is displayed that contains a gesture ID 1012 and a list box 1020 of behavioral movements 320. The list box 1020 displays behavioral movements 320 that are linked to the gesture IDs 1012. To correlate a new movement 320 to a gesture 1012, the sequence field of the list box 1020 is selected (whether blank or already filled with data). This generates a pop-up menu of available behavioral movements 320. Selecting an entry in the menu list links the movement 320 to the gesture identification 1012.

Figure 11A:
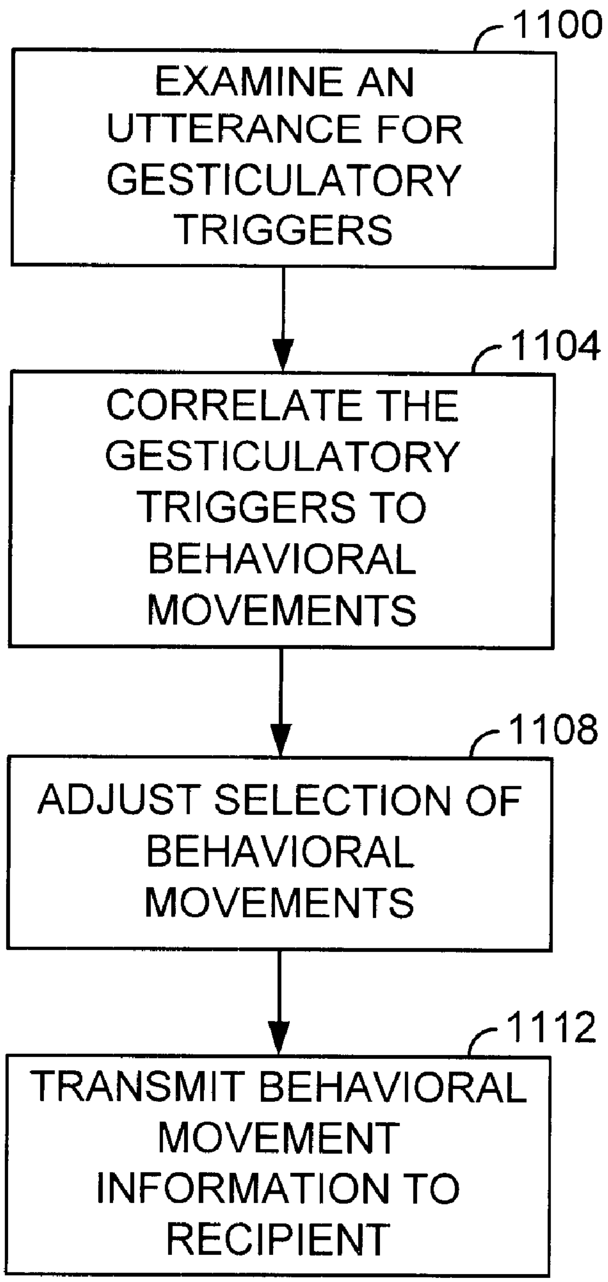
FIG. 11*a* is a flow chart illustrating a natural language processing.

FIG. 11*a* is a flow chart illustrating natural language processing in accordance with the present invention. In this embodiment, the contents of the data communication are analyzed to generate appropriate behavioral movements 320 for the user's visual representation 232. Therefore, in accordance with the present invention, visual representations 232 are sensitive to the semantic content imbedded in users' utterances, as their body language and gesticulations reflect what is said in the general flow of the communication session. These behavioral movements 320 are implicitly generated, through analysis of the content of a data communication, in contrast to explicitly generated behavioral movements 320 which are created in response to gesture commands. However, the behavioral movements 320.generated through natural language processing are still selected responsive to mood and personality choices of the user.

In this embodiment, the application module examines 1100 an utterance for gesticulatory triggers, correlates 1104 the gesticulatory triggers to behavioral movements 320, adjusts 1108 selection of behavioral movements 320 responsive to hierarchical personality-based phrasal considerations, and then transmits 1112 resultant behavioral movement information as part of a choreography sequence to the recipient(s) 100(2) in the place of behavioral information generated from a personality type and mood selection alone. For example, without natural language processing, a visual representation 232 will be acting during communication sessions in listening and fidgeting states responsive to behavioral movements 320 associated with the user's selected behavioral characteristics. Specific gestures are generated also responsive to selected behavioral characteristics. However, with natural language processing, the text of the communication is analyzed, and specific behavioral movements related to the content of the text are generated, also responsive to the selected behavioral characteristics. For example, if an ejective, such as "Wow" is part of a communication, the present invention generates a behavioral movement 320 appropriate for the phrase "Wow" and also appropriate for the personality and mood settings of the user. For example, if a user has selected an upperclass personality, the "Wow" is accompanied by a reserved facial expression, with a slight lift of the eyebrows. If the user has selected a rocker personality, the "Wow" is accompanied by head swaying, a goofy grin, and other facial and body attributes appropriate to the personality choice.

More specifically, to process a data communication for behavioral information, rules are used to quantify language content in a data communication. The rules are then associated with personality files 800. Upon determining that a word in a text communication belongs to a gesticulatory trigger class, the application module looks at the personality file 800 selected by the user for the visual representation 232 to determine which rule to apply to animate the user's visual representation 232. A gesticulatory trigger is a class of word which provokes a behavioral movement 320. In the example given below, gesticulatory triggers include prepositions, referents, ejectives, and other grammar objects which can be related to a specific facial or body movement.

The rules adhere to the following grammar:

A rule is defined as a weighting, a context, and an associated behavioral movement 320: Rule:= <weighting>* <context>*

A context is defined as a gesticulatory trigger which is a grammar sub-category, e.g., <context>:=<gesticulatory trigger>* [<gesticulatory trigger>]

A gesticulatory trigger is any useful sub-category of grammar, e.g., <gesticulatory trigger>:= Preposition|Ejective|Count Noun|Volumetric|Egocentricity|Xenocentricity|Negative|Positive|Referent|Specific*

The "*" symbol allows any amount of unrelated text to be placed after the gesticulatory trigger.

The weighting of the rule is the propensity of the visual representation 232 to perform an animation, e.g., <weighting>:=numeric value representing propensity to perform in the range 0 (never) −10 (all the time). These weightings are similar to the weighting by personality and mood settings for behavioral movements 320, as described above.

Some specific contexts are defined below:

Preposition :=any preposition

Ejective :=exclamatory words or phrases (e.g., "Wow")

Count Noun :=quantities (e.g., "Two" or "Three")

Volumetric :=volume indicators (e.g., "Tons" or "Huge" or "Very")

Egocentricity :=references to self (e.g., "I" or "Me" or "Mine")

Xenocentricity :=references to others (e.g., "You" or "They")

Negative :=denouncements (e.g., "No" or "Not")

Positive :=affirmations (e.g., "Yes")

Referent :=concept referents (e.g., "This" or "That")

Specific :=any word or phrase delimited by quotes

Accordingly, the application module analyzes an utterance to quantify and qualify gesticulatory triggers, and then translates the triggers into behavioral movements 320 utilizing the rule mappings. For example, for the rule mapping:

10 * Referent *ANIM$_{13}$ POINT_UPWARD the rule indicates that the associated visual representation 232 always (due to a high weighting of 10) points upward (plays the point upward animation or behavioral movement 320) when words such as "this" or "that" (referent gesticulatory triggers) are encountered in utterances. As the <context> rule is recursive, any gesticulatory trigger can be described in relation to any other trigger. Multiple rules are associated with each trigger, the selection of which rule and behavioral movement 320 to use is determined based on the selected behavioral characteristics. For example, for a positive gesticulatory trigger, a variety of positive behavioral movements are available to be animated; however, a behavioral movement that expresses the user's personality type 328 is the one selected to be animated when a positive is recognized in the utterance.

Figure 11B:
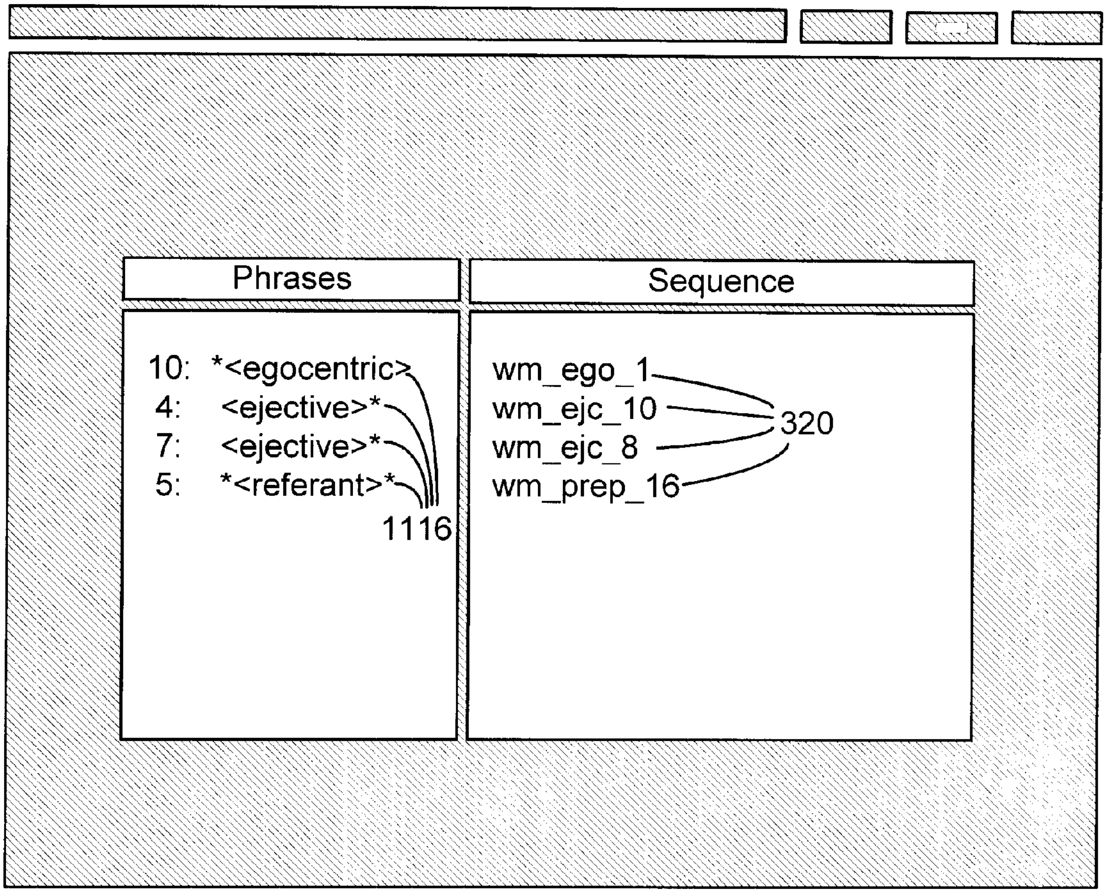
FIG. 11*b* is a flow chart illustrating processing predefined phrases in accordance with the present invention.
Figure 12A:
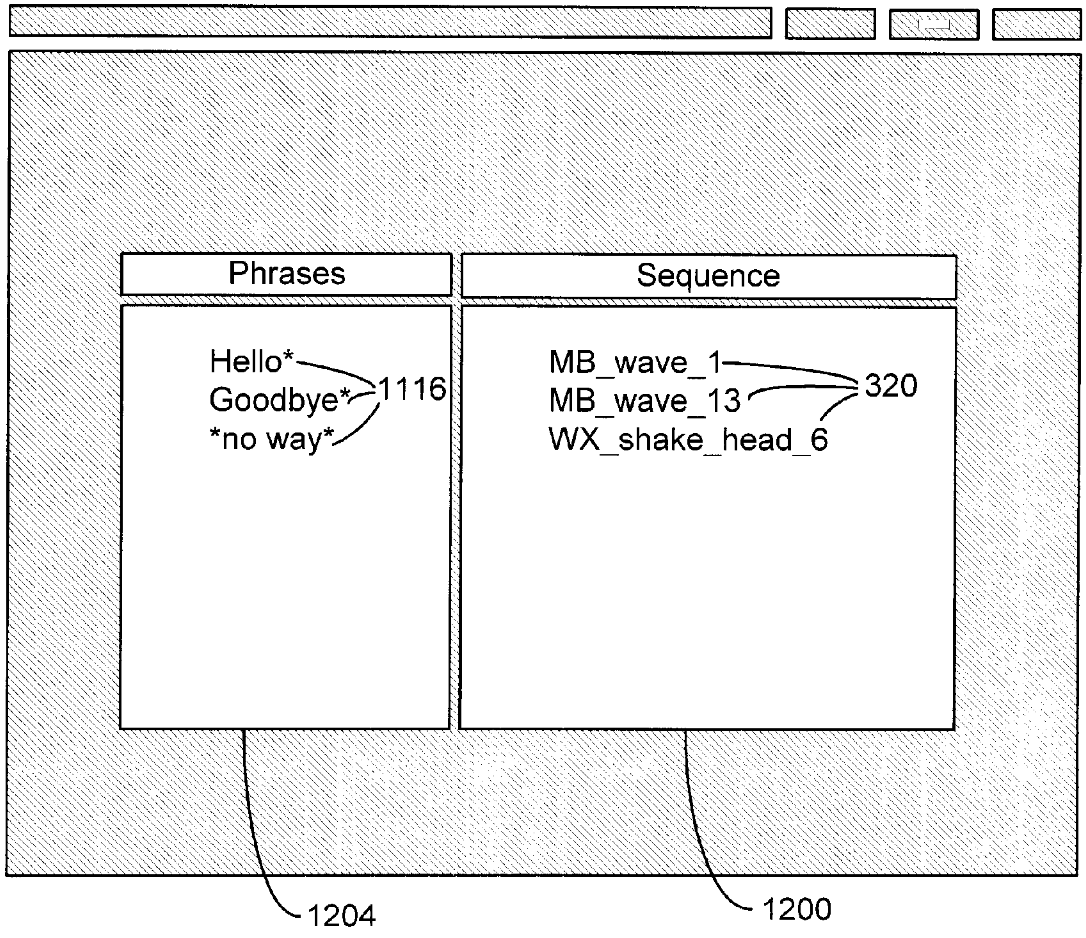
FIG. 12*a* is a screen shot illustrating an alternate embodiment of a predefined phrase editor interface.

In addition to rule mappings, each personality type 328 has a lexicon 816 associated to it. The lexicon 816, as discussed with FIG. 8, is a list of words linked to the personality type 328, each with a feature set (i.e., a list of gesticulatory trigger types —Preposition, Ejective, etc., —that apply to it). The lexicon 816 is used to recognize words in a text string, by comparing words in the text string to the lexicon 816. When a word is recognized, the associated gesticulatory trigger is known and can then be used to execute the rules associated with the gesticulatory trigger. FIG. 11*b* illustrates an embodiment of predefined phrase processing. Responsive to a phrase being recognized as belonging to a gesticulatory trigger class for a particular personality type 328, for example, "egocentric," the associated rule 1116 for the class is used to execute the associated behavioral movement 320. In this example, if "I" is typed, the rule 10:*<egocentric> is invoked, and the associated behavioral movement "wm _ego_1" is executed (in this case, because of the high '10' weighting, the movement 320 will always be executed.) FIG. 12*a* illustrates an alternate embodiment with a predefined phrase editor 1200 in accordance with the present invention. In this embodiment, the present invention controls the behavioral movement 320 of a visual representation 232 after parsing a text portion of an utterance to identify predefined phrases contained within the utterance. A list box 1204 is displayed in which the phrase entries 1208 of the list box 1204 are linked to behavioral movements 320. A parser processes users' typed dialogue (chat text) during a communication session for these phrases and upon identification of a predefined phrase, the associated behavioral movement 320 is initiated. For example, if the "sounds good" phrase is predefined and entered by a sender, upon recognition, the visual representation 232 animates one of the associate behavioral movements 320 with that phrase, for example, by making an "OK" symbol with his hand. Or, as shown in FIG. 12*a*, if the "no way" phrase is entered, the visual representation 232 shakes its head. The list box 1204 is preset with a standard set of phrases 1208 which each personality 328 can respond to. In a preferred embodiment, the list of phrases 1208 is different for each personality type 328, and are selected to evoke to a recipient the sense of the selected personality.

To add a new phrase 1208, a blank phrase field is selected, and then the user 100 enters the desired phrase. This produces a pop-up menu of available behavioral movements 320, and selecting an entry in the menu links the behavioral movement 320 to the phrase 1208.

Figure 12B:
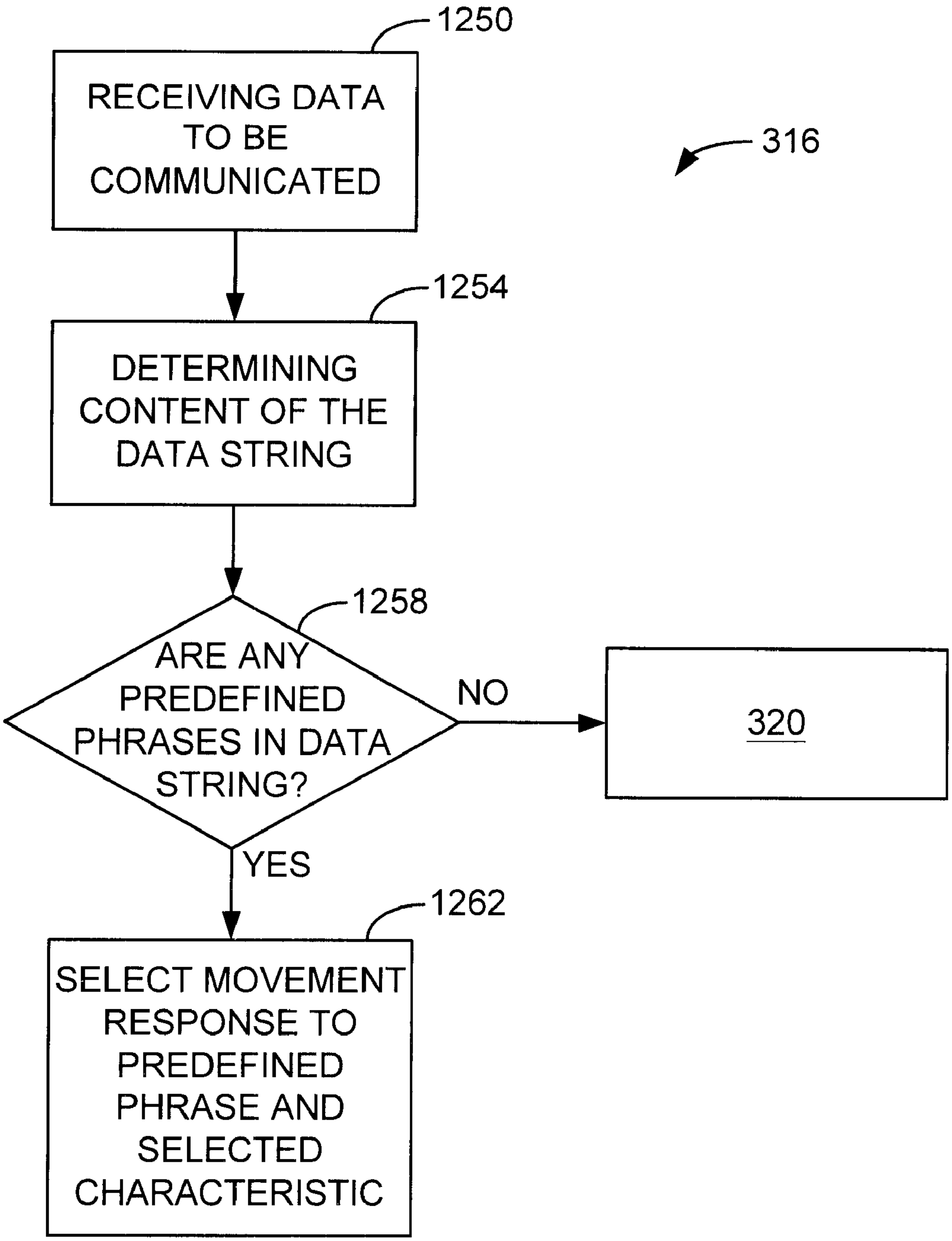
FIG. 12*b* is a flow chart illustrating an alternate embodiment of processing of predefined phrases.

FIG. 12*b* is a flow chart illustrating processing predefined phrases in accordance with the present invention. First, the application module receives 1250 data to be communicated. The data is analyzed 1254 to determine the content of the data string. More specifically, the application module determines 1258 whether any predefined phrases are present in the data string by comparing the words in the data string to a list of phrases associated with the selected personality. If there are predefined phrases within the data string, the application module selects 1262 a behavioral movement or movements that are linked to the identified predefined phrase.

Figure 13:
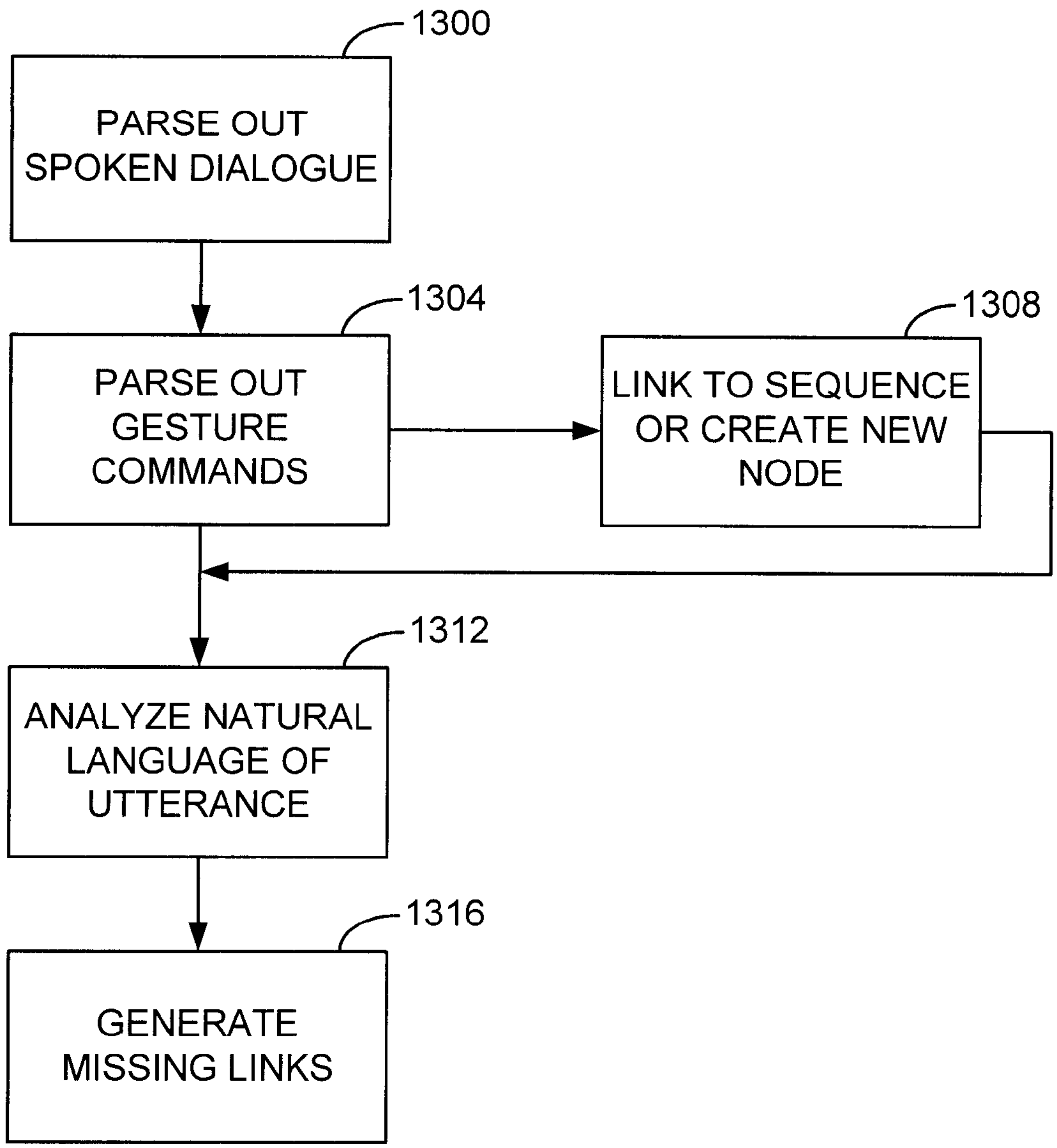
FIG. 13 is a flow chart illustrating the processing of a data communication.

FIG. 13 is a flow chart illustrating the processing of an utterance to generate a choreography sequence that accompanies an utterance, when a data communication is to be transmitted to other users 100. First, the application module parses 1300 out 'spoken' dialogue elements into a time coded choreography sequence base. The choreography sequence comprises a sequence of choreography sequence nodes, where each node represents a behavioral movement. Next, the application module parses 1304 the data string for gesture commands. Any gesture commands found are linked 1308 either to existing choreography sequence nodes or to entirely new nodes as needed. Then, the content of the data communication is analyzed 1312 using the natural language processing described above to generate control markers linked to appropriate choreography sequence nodes. Finally, any gaps in the choreography sequence are filled by generating 1316 behavioral movements 320 determined by the selected behavioral characteristics, either the preselected personality and/or mood intensity settings, or using the personality or mood intensity override settings, as described above.

The following are example utterances which may be received from a user 100 in accordance with the present invention:

| | |
|---|---|
| "Hello, how are you?" | (simple text input) |
| "Hello, how are you? (wink)" | (text with a gesture identifier 1012) |
| "(flamboyant) Hello, how are you?" | (text with a personality override) |
| "(100) Hello, how are you?" | (text with a mood intensity override) |
| "(flamboyant)(100) Hello (wink), how are you?" | (text with a gesture identifier and personality and mood intensity overrides) |

Figure 14A:
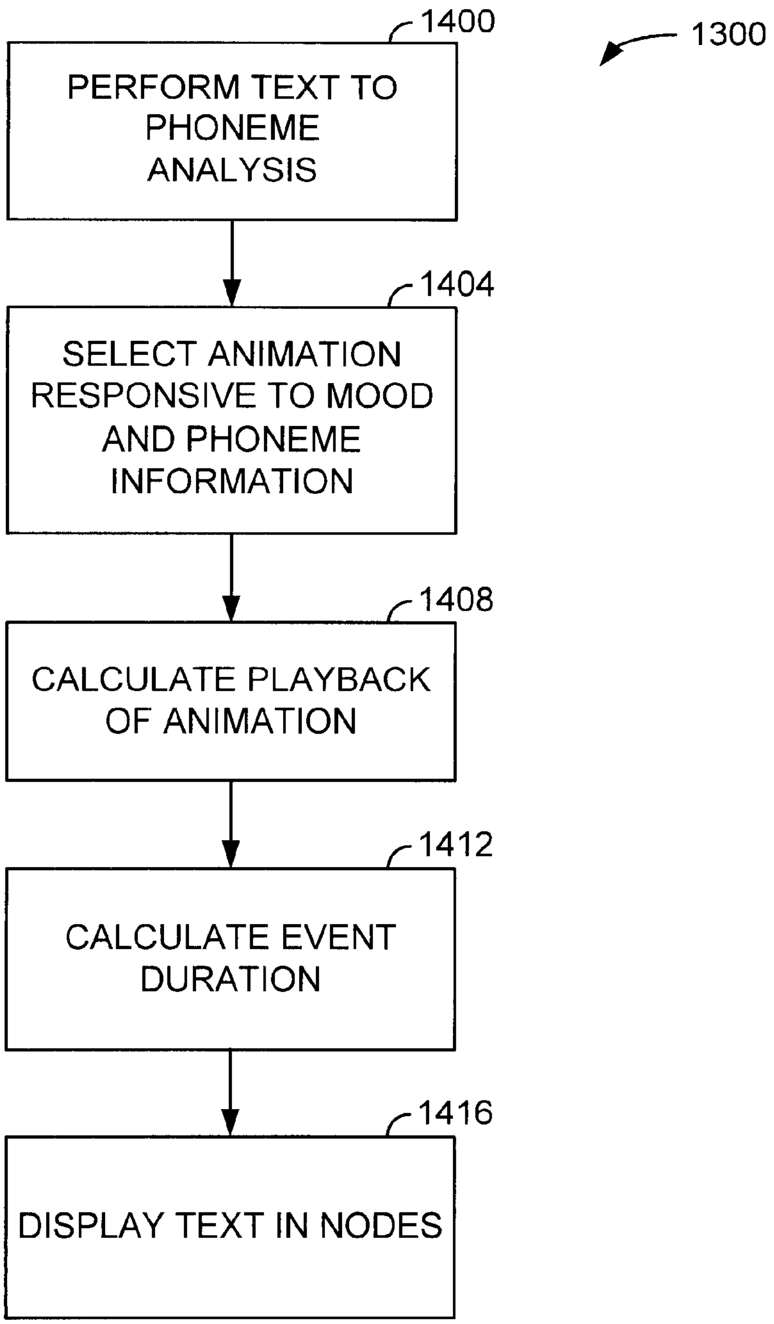
FIG. 14*a* is a flow chart illustrating generating a choreography sequence in more detail.
Figure 14B:
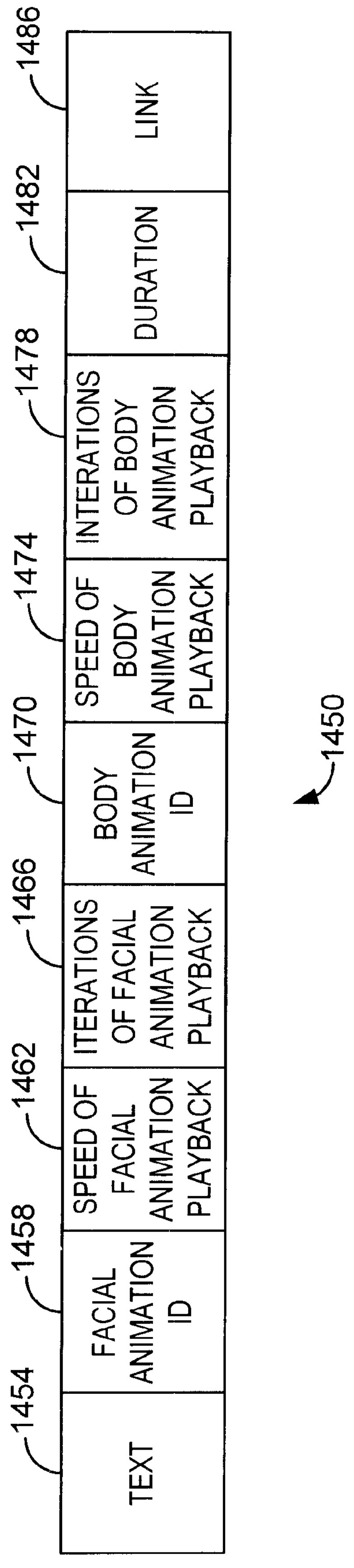
FIG. 14*b* is a block diagram of a node.
Figure 14C:
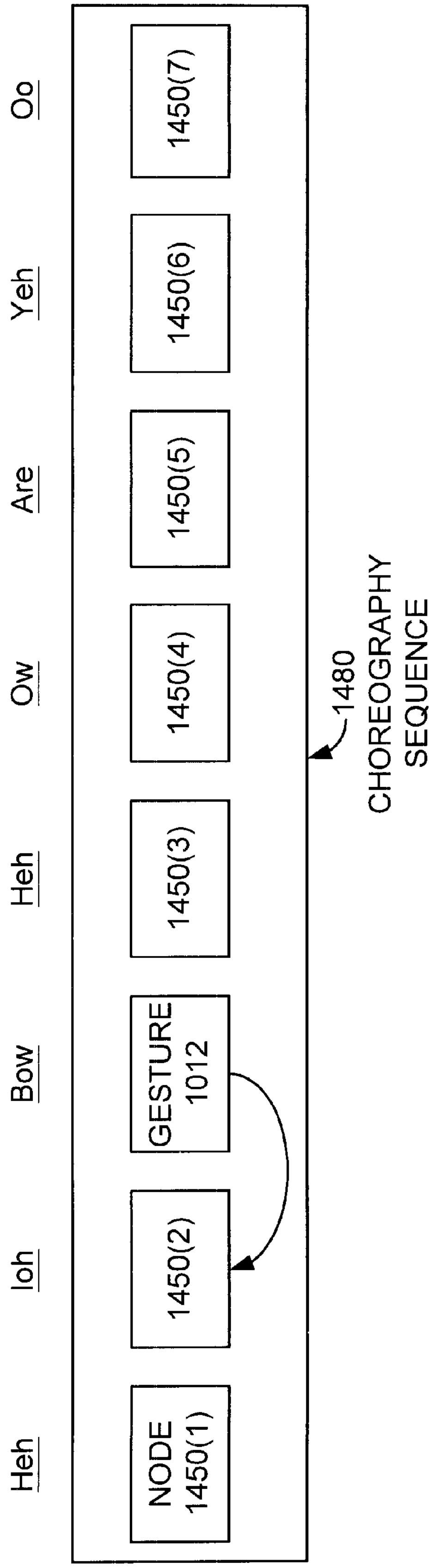
FIG. 14*c* is a block diagram of a choreograph sequence.

FIG. 14*a* is a flow chart illustrating developing a choreography sequence in more detail. The choreography sequence 1480 is essentially a linked list of time coded events. As shown in FIG. 14*b*, each of the nodes 1480 in the list has the following components:

Text (dialogue) to be displayed during the event 1454
Facial Animation ID 1458
Speed of Facial Animation Playback 1462
Iterations of Facial Animation Playback 1466
Body Animation ID 1470
Speed of Body Animation Playback 1474
Iterations of Body Animation Playback 1478
Duration (in milliseconds) of the event 1482
A link 1486 to the next node (event) in the choreography sequence First, the application module performs 1400 a text-to-phoneme and punctuation analysis of the utterance to generate nodes 1450. Given the example dialogue "Hello, how are you", as shown in FIG. 14*c* this would result in 7 nodes 1450 being created as the base choreography sequence 1480 (one for each of 'heh', 'loh', 'heh', 'ow', 'are', 'yeh', 'oo'). Once created, the nodes 1450 are completed as follows:

Referring back to FIG. 14*a*, facial and body articulatory behavioral movements 320 are chosen 1404 for each node 1450 and their IDs fill their respective data slots 1458, 1470 of the node 1450. The body movements 320 are selected from a generic pool or set of movements 320 used by all visual representations 232 responsive to selected behavioral characteristics. The facial movements 320 are selected from this pool using phonemic and personality 328 criteria, with the goal of having the behavioral movement 320 approximate the node's phonemic quality (e.g., 'oh' versus 'ee' versus 'buh', etc.) while being responsive to the selected personality type 328. Next, the appropriate facial and body movements 320 are selected responsive to the selected mood intensity 336. The mood intensity 336 is derived from either the visual representation default setting or, if present, a mood intensity override. In a preferred embodiment, sets 332 of each phonemic facial movements and body behavioral movements 320 are stored for each visual representation 232 as determined by the personality type 328. In one embodiment, 21 behavioral movements 320 per set are stored, representing the range of mood intensities from −100 to 100 in steps of 10, and the behavioral movements 320 from within the set are selected based on the mood intensity 336 selected. The selected mood intensity 336 provides weights to the behavioral movements 320, and the application module selects a behavioral movement 320 responsive to its weights.

Then, a facial and/or body behavioral movement playback rate is calculated 1408 for each event, responsive to the base rate of playback inherent in each behavioral movement 320 and any adjustments caused by the selected behavioral characteristics, as is discussed above in connection with FIG. 4*b*. For example, the mood intensity 336 can be designated to effect the rate of playback (the more intense the speaker, the more quickly the text is delivered and behavioral movements 320 animated). This information is used to fill the speed of playback components 1462, 1474 of the node 1450. Event durations are then calculated 1412 for each event, responsive to the base playback time inherent in each behavioral movements and any adjustments caused by the selected behavioral characteristics and is used to fill the duration component 1482 of the node 1450. In the first example described above, the comma after 'Hello' implies a pause lengthening the duration of the event (i.e., the start of the next event). Nodes 1450 also comprise iteration information which is obtained from the identified behavioral movement files. The iteration information controls the number of times a behavioral movement 320 is played when called. This allows very small files to be stored for animations requiring repetitive motion. For example, if the visual representation 233 is playing with a yo-yo, a single behavioral movement file comprises a single up-and-down motion. To have the visual representation 232 "play" with the yo-yo, the iteration control is set to have the visual representation 232 animate the up-and-down motion a number of times.

Text to be displayed is entered 1416 in the appropriate component 1454 of the node 1450. This is performed on a word by word basis, in contrast to a phoneme by phoneme basis. Therefore, while some words (e.g., 'table') in an utterance produce more than one node 1450, the entire orthography is represented at once with the first node 1450. Once a next node is created, the link 1486 component is written with the information regarding the location in memory of the next node 1450.

Figure 15:
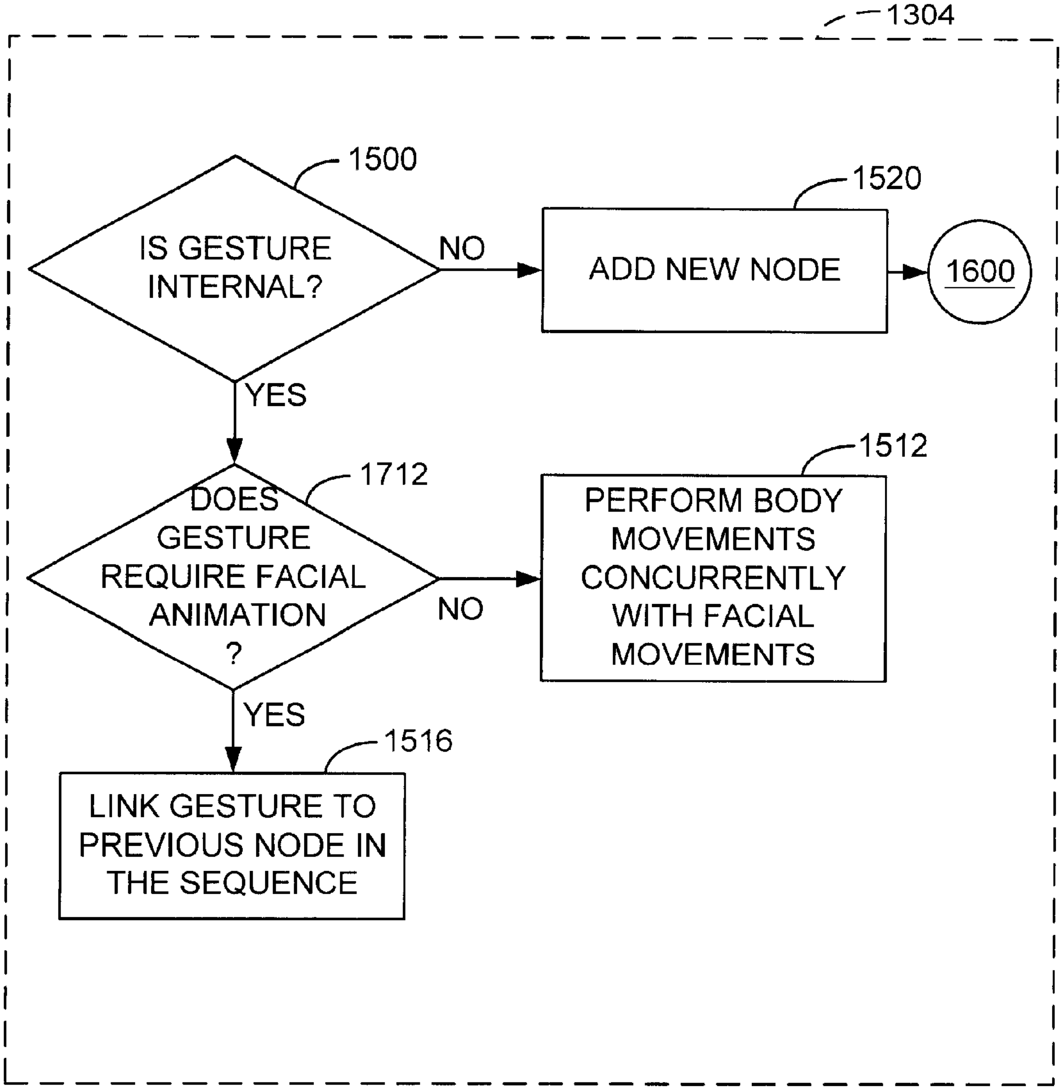
FIG. 15 is a flow chart illustrating parsing out gesture commands in more detail.

FIG. 15 is a flow chart illustrating parsing out gesture commands block 1304 in more detail. First, the application module 120 determines 1500 how the gesture is presented in the data communication. If the application module 120 determines that the gesture command is independent of the rest of the data in the data communication, the application module 120 does not consider 1504 the interaction between the behavioral movements 320 specified by the gesture and the behavioral movements 320 dictated by the text in creating the choreography sequence 1480. If the application module 120 determines 1508 that the gesture is an internal gesture, i.e., text occurs after the gesture, the application module 120 determines 1508 whether the gesture requires facial movements 320. If the gesture does not require facial movements 320, the application module specifies 1512 that the body movements 320 are to be performed concurrently with the facial movements 320 specified by the text. If the application module determines that the gesture does require facial movements, (e.g., laughing), the gesture is linked 1516 to the previous node in the choreography sequence 1480. Thus, on execution the choreography sequence 1480 is paused upon reaching this node 1450, the behavioral movement 1450 dictated by the gesture is executed, and then the choreography sequence 1480 is resumed. For example, as shown in FIG. 14*b* given the data communication "hello (bow), how are you?", which does not require facial movement, the gesture (bow) 1012 is associated to the previous node 1450(2) established for the phoneme "lo"), and the 'bow' movement 320 is performed concurrent with the animation of the hello phrase. In contrast, given the utterance "Why, hello (laugh), how are you?," which requires facial movement, a node 1450 for the gesture (laugh) is inserted between the last node 1450 for the word "hello" and the first node 1450 for the word "how," and the visual representation 232 pauses after animating the word hello and animates a laugh.

If the application module determines that the gesture is a terminal command, and thus the data communication does not have text positioned after the gesture, a new node 1450 is added 1520 to the choreography sequence 1480. Upon execution, when reaching this node 1450, the behavioral movement dictated by the gesture is executed. For example, for the phase "Hello, how are you? (wink)," a node is added for the wink gesture after displaying "you."

The gesture data are entered into the selected (or newly created) nodes 1450 as body and facial movements 320. Links to behavioral movement files to support the body and facial movements are obtained responsive to the personality type 328 for the selected personality.

Figure 16:
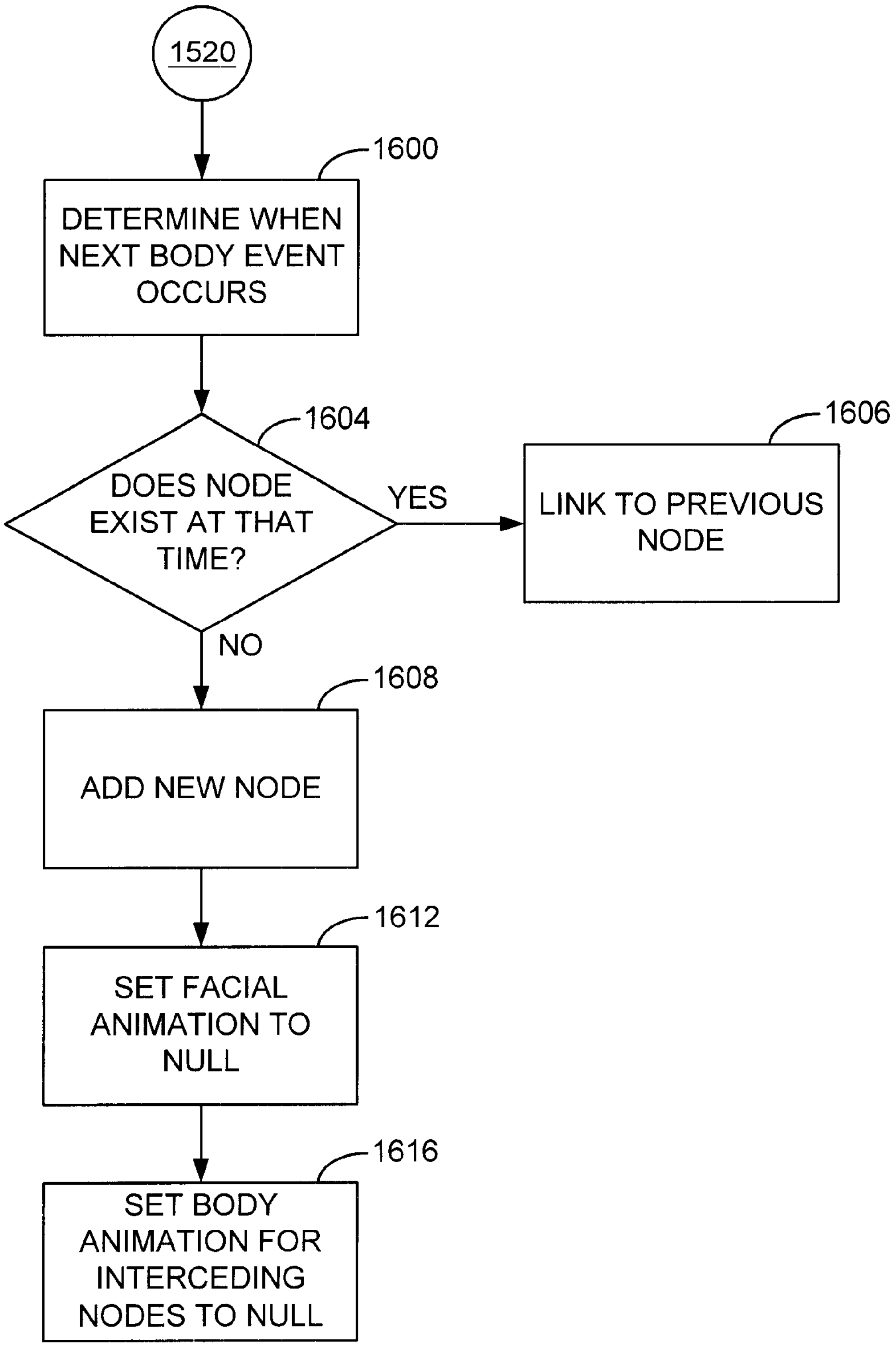
FIG. 16 is a flow chart illustrating adding nodes to a choreography sequence in more detail.

Next, duration information is calculated for the gesture. For a terminal gesture, duration information is also calculated for the gestures from the identified animation sequence file 320 and is entered into the newly created node 1450. For internal gestures, as shown in FIG. 16, the application module determines 1600 when the next body behavioral movement 320 should be and determines 1604 whether a node 1450 exists for that time. If the application module determines 1604 that no choreography sequence node 1450 exists for that time, a new node 1450 is inserted 1608 into the list. If a node 1450 exists, the behavioral movement 320 is linked 1606 to that node by writing the gesture movement information to the existing node 1450. The facial animation fields are set 1612 to NULL if the new node 1450 is a body control point only (e.g., bowing). The insertion of a new node 1450 affects the duration of the next event (node) as well as the duration of the gesture's own node 1450. For example, if two nodes 1450 existed such that the first node 1450 had a duration of 1000 milliseconds before processing the second node 1450, and a third node 1450 was inserted ¾ of the way into this interval, then the first node's duration becomes 750 milliseconds and the (new) second node's duration becomes 250 milliseconds. For all interceding nodes 1450 (those between when the gesture starts and when a new body animation control can be attached), the body animation fields are set 1616 to NULL (since no controls may be associated while the gesture is in progress).

Figure 17A:
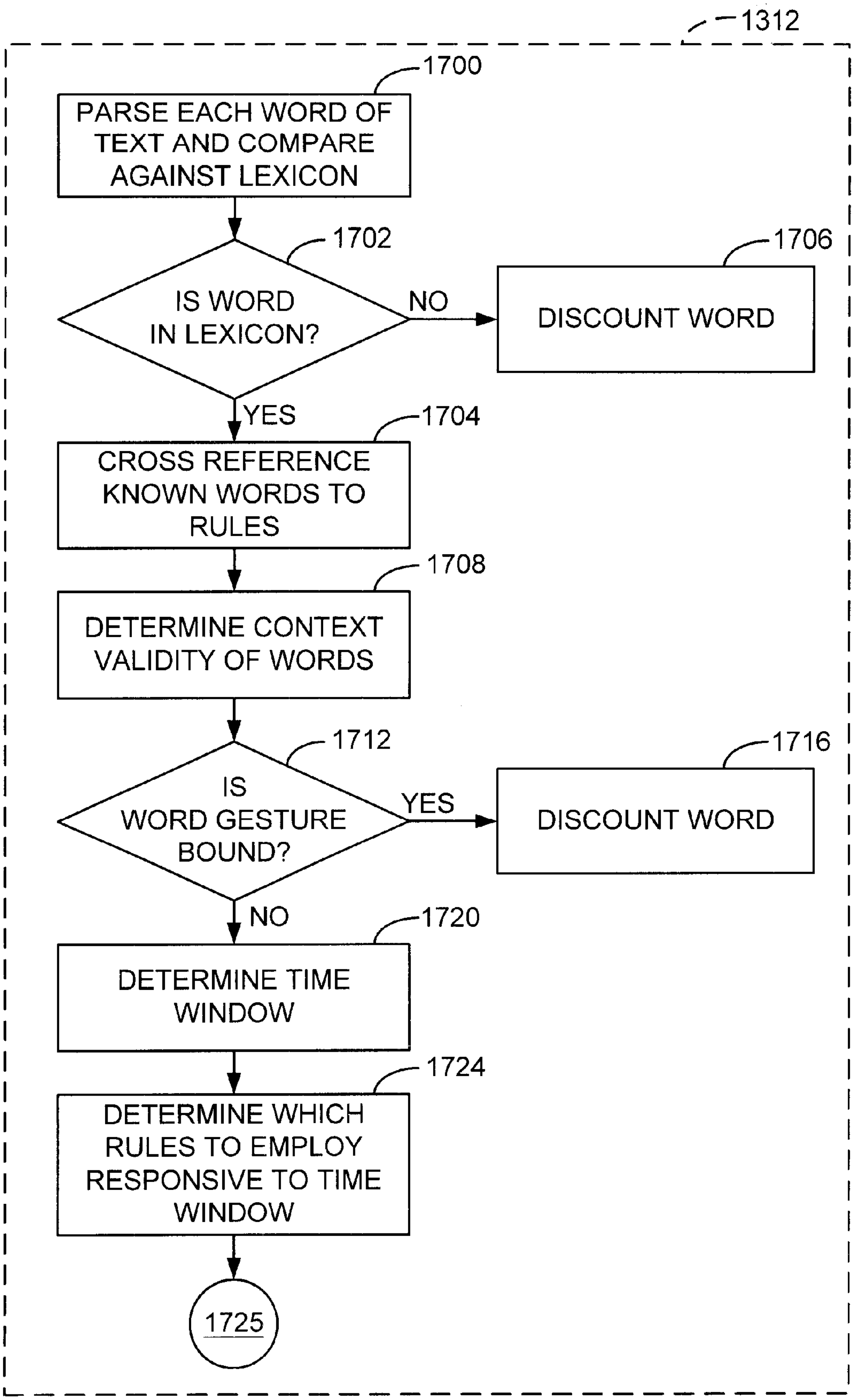
FIG. 17*a* is a flow chart illustrating analyzing the content of the data communication using natural language processing.

FIG. 17 is a flow chart illustrating a preferred embodiment of natural language processing block 1312 in which the content of the data communication is analyzed to create nodes 1450 for a choreography sequence 1480. First, as described above with respect to FIG. 11*a*, each word of text is parsed 1328 and compared against the personality's lexicon 816 to see if it is known. If the word is found 1702 in the lexicon 816, the known words are cross referenced 1704 to rules 1116 listed by the personality file 800. For example, if the data communication contained the word "you" and this word was entered in the personality's lexicon 816, then the feature set for the word (the list of trigger types that it represented) taken from the lexicon 816 is used to retrieve all the rule mappings 1116 that apply (in this case, all the rule associated with the Xenocentricity gesticulatory trigger). If the word is not found in the lexicon 816, the word is discarded 1706. Then, context validity is determined 1708 against the selected rule 1116 (i.e., ensure that the word matches the criteria stated in the rule). Then, the application module 120 determines 1712 whether or not known words are gesture bound. Gestures are explicitly requested by the user and as such, have a higher priority than behavioral movements 320 generated from natural language processing. Checking a gesture binding is merely a matter of reviewing the choreography sequence 1480 for body animation controls that exist during the delivery of the known word, as parsing the communication for gestures has, in the preferred embodiment, already been accomplished as described above. If a known word is gesture bound, the behavioral movement rules 1116 pertaining to the known words are discounted 1716.

Next, the application module 120 determines 1720 time window factors. This step involves correlating behavioral movement durations (given by the behavioral movement files 320 associated with each rule 1116) and the available time between when the movement 320 starts and the next known (body) movement 320 begins. For example, given an utterance of "Wow, thank (bow) you very much", the (bow) gesture will be processed to start with the first node 1450 associated to the word "thank". Although the word "Wow" is not gesture bound, there is only a finite amount of time before the (bow) gesture must be initiated. This means that any rule 1116 that is mapped to a movement 320 which is longer than that time window and is applicable to "Wow" must be discounted. To aid in the usability of behavioral movements 320, the playback rate of the behavioral movement 320 may be adjusted by as much as 33% to fit a time window. This process of assessing time windows further reduces the set of applicable known word rules 1116.

Figure 17B:
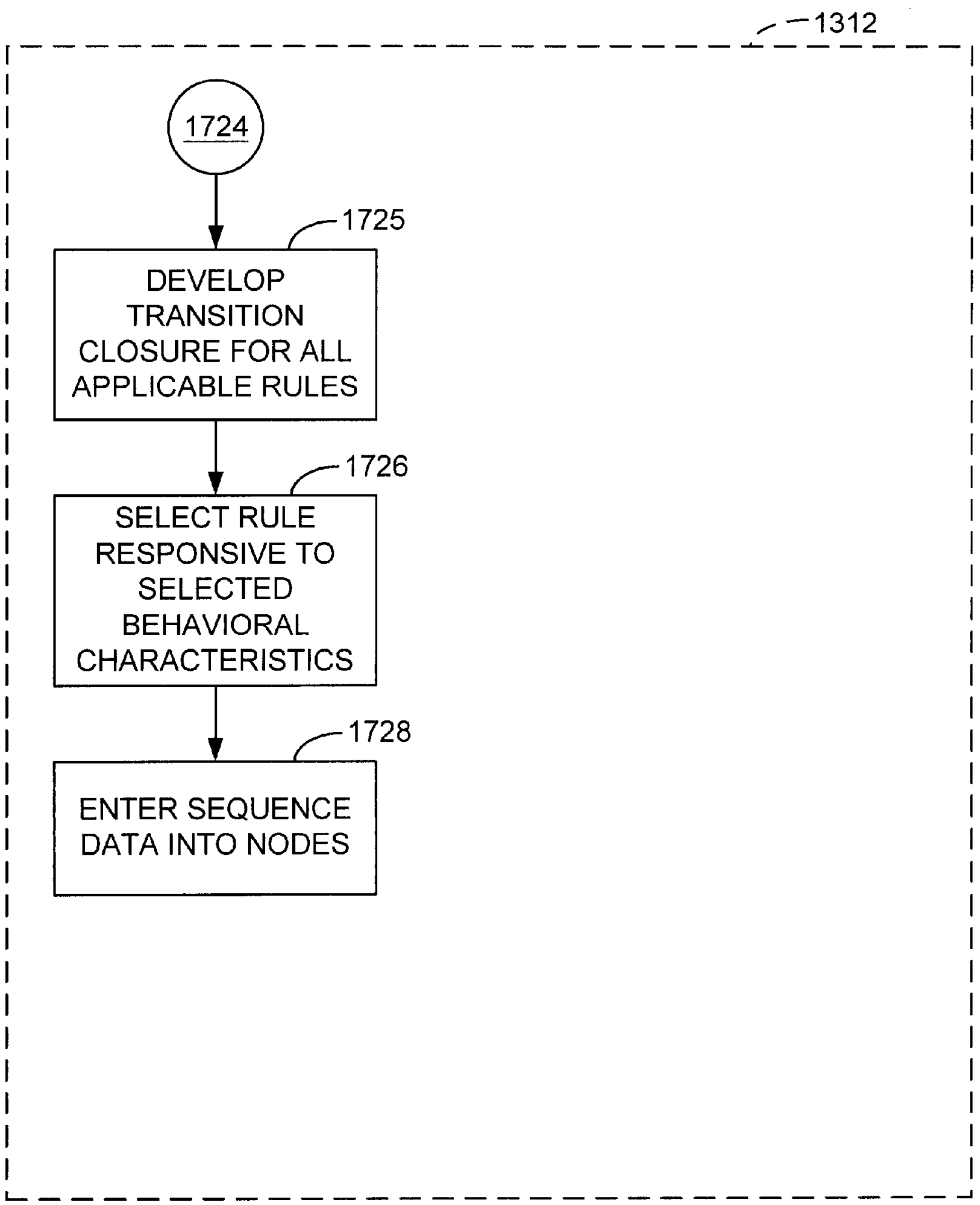
FIG. 17*b* is a continuation of the flow chart of FIG. 17*a*.

The application module 120 then determines 1724 which rule 1116 to employ. Preferably, the application module 120 calculates interaction effects of the word rules. This involves predetermining the effects on sequence binding and event time windows for each potential rule selection, since choosing one behavioral movement 320 might discount another because its start point would be bound or its required time window made unavailable. Doing this for all possible rule combinations produces 1725 the transitive closure, the set of all potential applications of the available rules 1116 to the utterance. As shown in FIG. 17*b*, calculations against the transitive closure are made 1726 using heuristics including weightings and mood intensities. Each rule 1116 has a weight, or propensity to happen, attached to it as determined by mood settings 336. Making calculations against these will tend to indicate one application of the rules 1116 over another. For example, if one application of the rules involved three behavioral movements 320, each with a weighting of 5, and another involved two movements 320, both with weightings of 8, then the second application would be indicated as more likely to happen. Once the rule application has been determined, the sequence information is incorporated into the choreography sequence 1480 as with gestures. Finally, the application module enters 1728 the behavioral movement information into the appropriate start nodes 1450 as body animation information.

Figure 18:
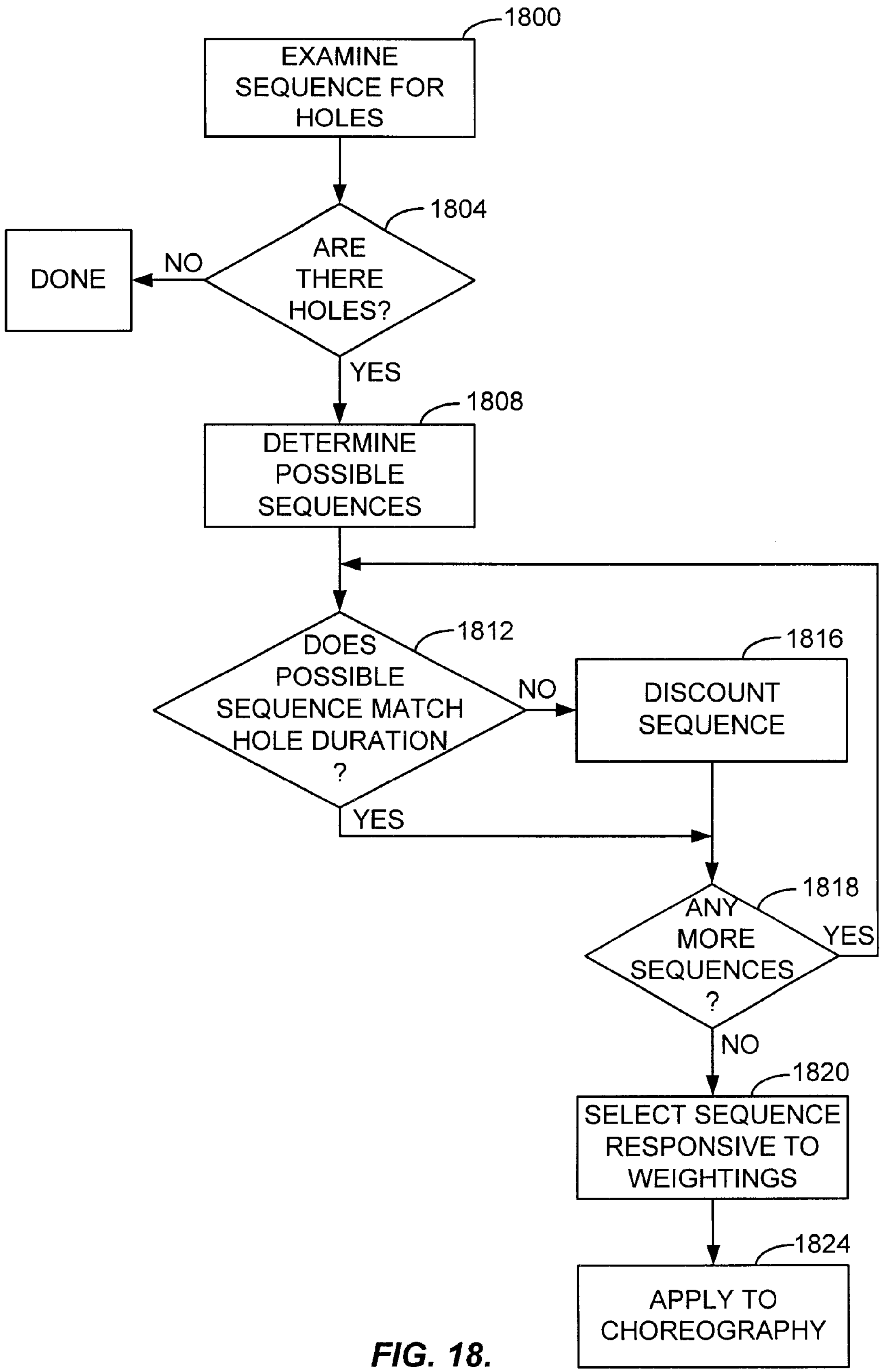
FIG. 18 is a flow chart illustrating generating behavioral movements to address any missing links in the choreography sequence.

FIG. 18 is a flow chart illustrating generating behavioral movements 320 to address any missing components in the choreography sequence 1480. At this point the choreography sequence 1480 may still have places where there is no body control (i.e., holes between gestures and behavioral movements 320 generated from natural language processing). The choreography sequence is 1480 therefore completed with generic behavioral movements 320 selected responsive to selected behavioral characteristics. The choreography sequence list 1480 is first examined 1800 for body control holes. If a hole is discovered 1804, then a pass through the personality data is made to determine 1808 which behavioral movements 320 are usable given the selected mood intensity value. In one embodiment, the set of behavioral movements 320 which are usable is limited to those behavioral movements 320 which are associated with the selected personality type 328. Durations of the behavioral movements 320 in this set are then assessed 1812 against the hole duration. Durations are determined from the base sequence duration contained in the sequence file and interpolated mood intensity effects on the playback rate. If a behavioral movement 320 does not fit within the hole time window, the movement 320 is discounted 1816. A behavioral movement 320 can be rate adjusted to create a fit; however, the rate cannot be adjusted too fast or too slow such that the integrity of the behavioral movement 320 is threatened.

After a behavioral movement 320 is assessed, the application module 120 determines 1818 whether there are remaining behavioral movements 320 to be assessed. If there are, a next behavioral movement 320 is selected and assessed until all possible movements 320 are assessed. Of the viable remaining behavioral movements 320, a behavioral movement 320 is selected 1820 to fill the hole responsive to the weightings of the behavioral movements 320. Alternatively, the behavioral movement 320 is selected randomly from the set of viable remaining behavioral movements 320. In one embodiment, the personality type 328 is linked to a set of behavioral movements 320, and a mood intensity setting 336 is linked to a set of behavioral movements 320 which correlate to that mood intensity 336. Upon selection of a personality type 328 and a mood intensity setting 336, the intersection of the two sets of behavioral movements 320 provides the set of movements 320 from which a behavioral movement 320 is selected. The selection can be made due to weightings or can be selected randomly.

The selected behavioral movement 320 is applied 1824 to the choreography sequence 1480 in the same manner as described above with gestures and natural language processing. The process is repeated for each hole, and a pass is made through the entire sequence 1480 again to ensure that filled holes are completely filled, and do not have any remainder holes. The finished choreography sequence 1480 is placed in a binary TCP/IP packet along with information as to who is speaking for transmission to the server 212.

Producing a listening choreography sequence is a subset of producing a choreography sequence 1480. Specifically, it may be viewed as filling a single large hole as described above. The listening sequence list is created just as the choreography sequence 1480 is, with only two nodes, the beginning and the end of the sequence (the duration of the first node being the total duration of the choreography sequence). The incoming choreography sequence 1480 is examined to determine the duration of the listening event. The listening sequence is completed as discussed above in filling holes, the only difference is that facial animation control is added as well as body control. In one embodiment, the listening sequences are generated for playback by each user's computer when a choreography sequence 1480 is generated and received. In contrast, a choreography sequence 1480 is produced on a first user's computer 108, and is then relayed to other users 100 through the serving computer as TCP/IP packet(s). However, in a preferred embodiment, as the listening movements are selected responsive to behavioral characteristics, the listening movements are also transmitted to other users 100 to provide other users 100 with behavioral information regarding the recipient 100(2).

Processing fidgets is similar to the processing of listening movements, as the personality data of the visual representation 232 is examined to determine which behavioral movements 320 are usable given the mood intensity value 336, and behavioral movements 320 are selected responsive to the weightings of the movements 320. In a preferred embodiment, the behavioral movements 320 or behavioral movement information are then sent to other users 100 to allow the other uses to learn about the user 100 through the behavioral fidgeting movements of the user's visual representation 232.

Once a choreography sequence 1480 has been generated or received, the sequence is played back by processing the nodes 1450 of the sequence 1480. Each node 1450 indicates which commands are to be issued when the node 1450 is processed, the text field 1454 contains which text (if any) is to be displayed, the animation fields 1458 for both facial and body control indicate which behavioral movements 320 are to be played and at what rate (including iteration information), and the event duration field indicates when the next node 1450 is to be processed. Thus, in accordance with the present invention, the choreography sequence 1480 is transmitted by a user 100(1) to a recipient 100(2) to communicate behavioral information over a remote network and thus provide a context within which the recipient 100(2) can interpret communicated data. Upon viewing the visual representation animated in accordance with the received choreography sequence 1480, the recipient 100(2) can interpret the communicated data in context, and thus a more complete communication is enabled for remote electronic exchanges.

In a preferred embodiment, new behavioral rules 1116 are learned through the course of user interaction with the application module of the present invention. Learned rules allow the behavior of the visual representation 232 to be modified without the requirement of specific user directives. This provides a more natural and enjoyable experience for the user, as the visual representation 232 takes on a 'life' of its own. Additionally, in one embodiment, the learned behavior is generated responsive to the user's own input, thus tailoring the behavior of the virtual representation 232 to the user's own personality. For example, if the user selects a nod gesture for the words 'yes', 'yeah', and 'yup', it can be inferred that the user wants to have his or her virtual representation 232 animate a nod when the user wants to respond in the affirmative. Additionally, it can be inferred that this user likes to have his or her virtual representation 232 animate behavior during conversation. Thus, one of the goals of the present invention is to recognize such patterns, and generalize that behavior into rules that tailor the behavior of the virtual representation 232 to the personality of the user, and to generate new rules without requiring specific user input. For example, in the above case, a new rule can be generated to have the user's virtual representation 232 animate a nod in response to all affirmatives, even for those specific types of affirmatives that the user has not yet included in an utterance. For example, if a general rule of animating a nod responsive to transmitting an affirmative statement has been derived in the above example, the next time the user types in, for example, 'sure', a nod is animated. Thus, the virtual representation 232 has learned the behavior of nodding in response to transmitting affirmative statements.

Figure 19:
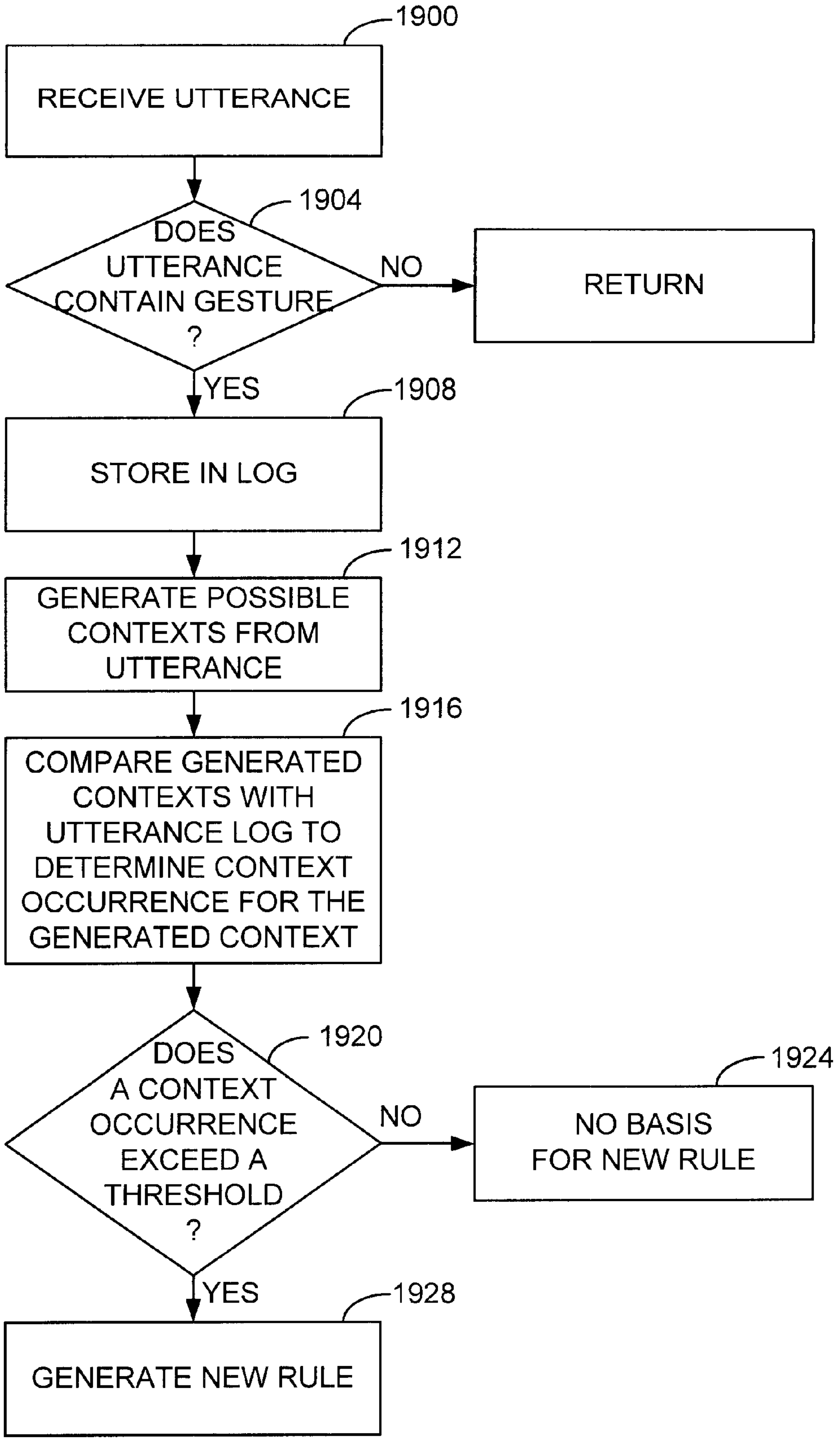
FIG. 19 illustrates a process of generating possible contexts from an utterance.

In one embodiment, behavioral learning is accomplished by analyzing user utterances having gestures for possible contexts that can be used as the basis for potential new behavioral rules 1100. FIG. 19 illustrates a process of generating possible contexts from an utterance. First, an utterance is received 1900 by the application module 120. Typically, the behavioral learning processing is performed on each user's computer 100, and therefore the modules 120 providing this functionality are located on the user's computer. However, this processing could occur on the server 112, or elsewhere in the system. The utterance is typically received responsive to a user entering information through a keyboard, through voice commands as translated by a speech recognition module, or any other means of entering information into a computer. The utterance is analyzed 1904 to determine if the utterance contains a gesture. Utterances with gestures are chosen as the basis for behavioral learning because through the selection of a gesture, the user is indicating behavior that the user would like his or her virtual representation 232 to communicate. Through repetitive use of a gesture with specific words, the user is indicating the words or type of words with which the user associates this behavior.

Figure 20:
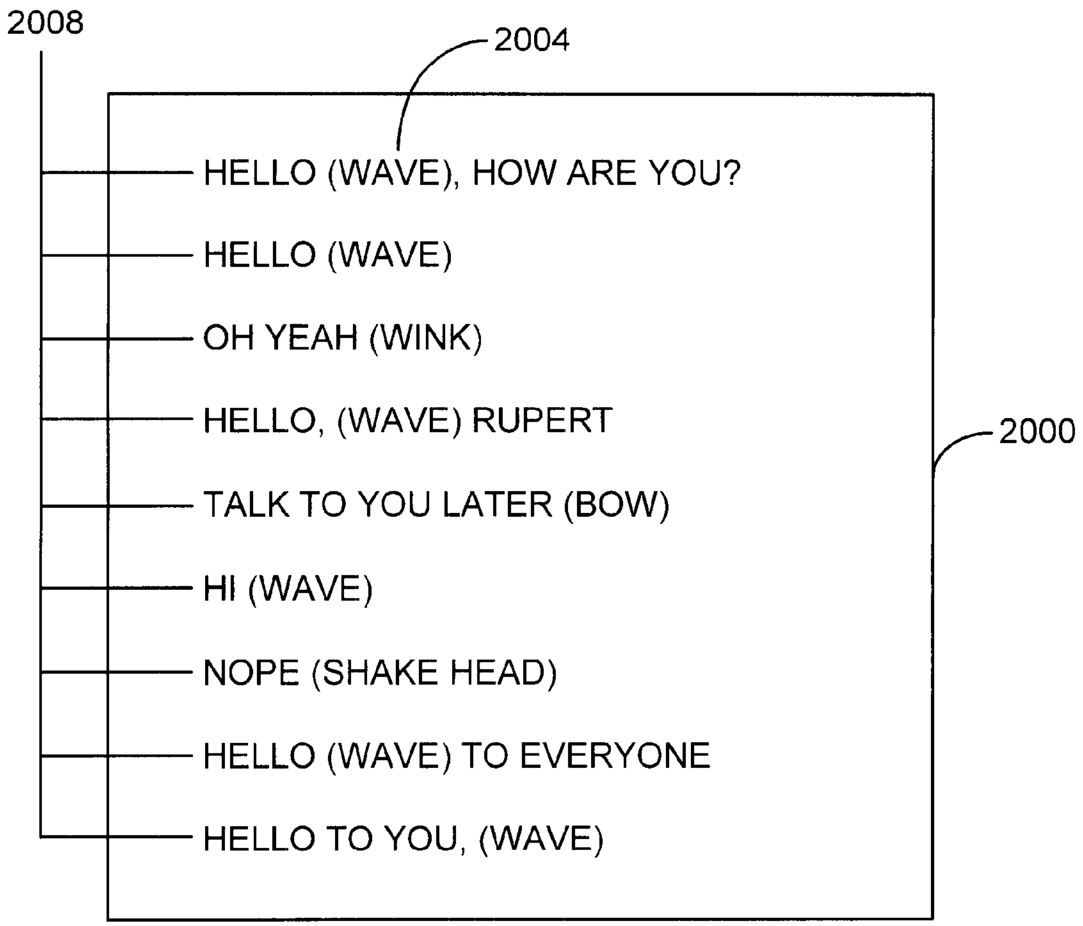
FIG. 20 illustrates an utterance log.

If the application module 120 determines that an utterance contains a gesture, the utterance is preferably stored 1908 in an utterance log. FIG. 20 illustrates an exemplary utterance log 2000. The utterance log 2000 is typically maintained on the user's computer 100, but can also be maintained on the server 112 or in any other location in the system. In the utterance log 2000, nine utterances 2008 having gestures 2004 are listed. In a preferred embodiment, the log 2000 stores all of the utterances 2008 transmitted by a single user that contain gestures 2004. Although utterances 2008 are illustrated in FIG. 20 as being stored in an utterance log 2000, portions of the utterance 2008 or representative information of the utterance 2008 could also be stored in an utterance log 2000 in accordance with the present invention. Next, possible contexts for a newly received utterance 2008 are generated 1912. As discussed above, contexts are data structures consisting of a gesticulatory trigger class and text. For behavioral learning, however, only contexts containing gestures are considered, for the reasons discussed above.

Figure 21A:
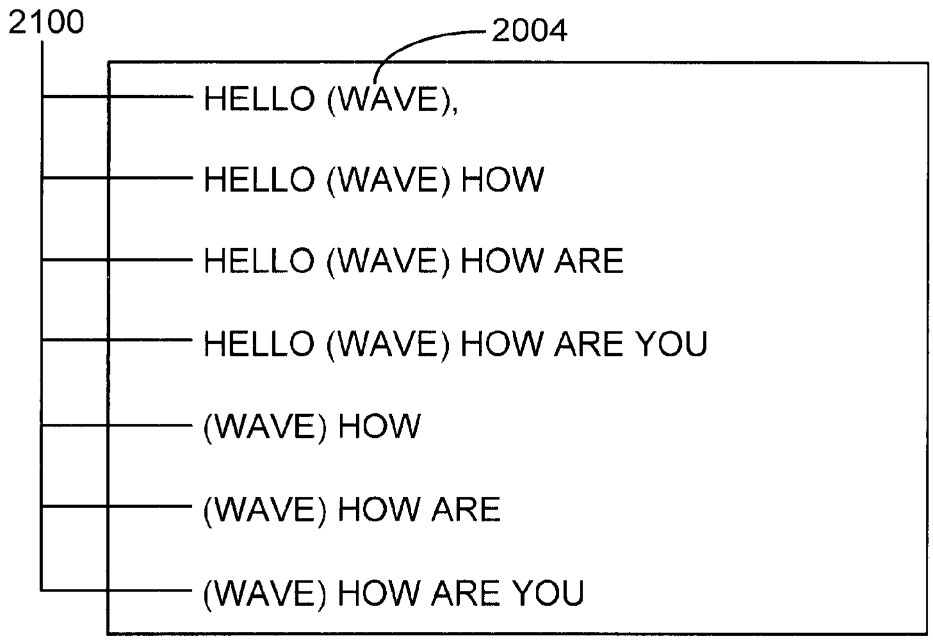
FIGS. 21A–C are charts of contexts generated from received utterances.
Figure 21B:
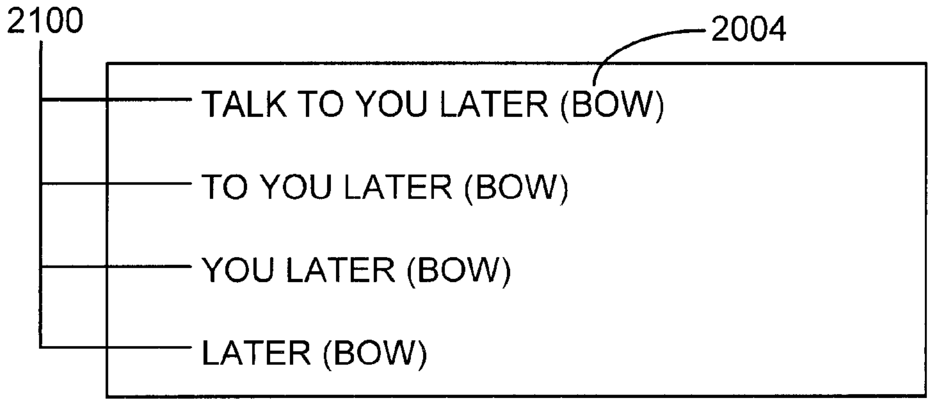
Figure 21C:
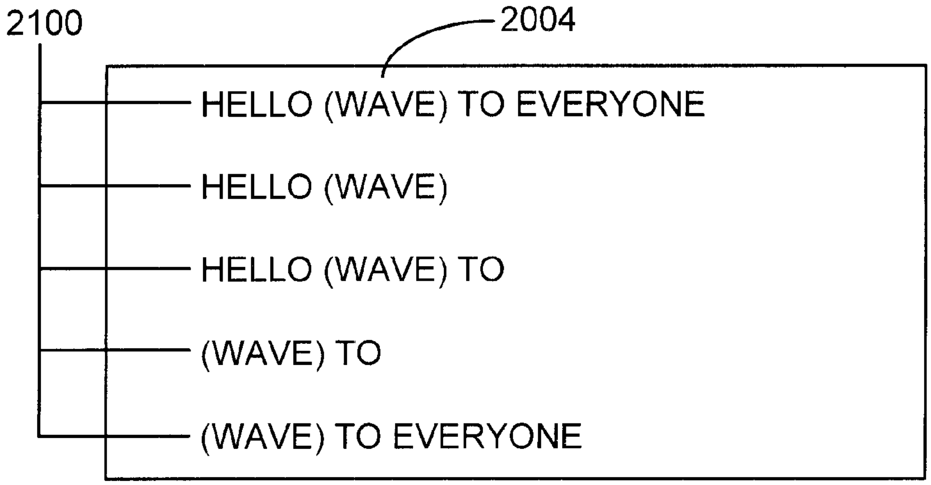

FIGS. 21*a–c* are charts illustrating contexts generated from received utterances. FIG. 21*a* illustrates an exemplary list of contexts 2100 generated from the utterance 'Hello (wave) how are you?' Generated contexts 2100 are derived by parsing an utterance 2008 for text in combination with a gesture 2004. This is an iterative process as can be seen below, and the method described therein is only one method of generating the contexts 2100. Other methods could also be used in accordance with the present invention. The generated contexts 2100 are all those combinations of words and gestures in an utterance 2008 that are non-duplicative, while maintaining the integrity of the word order of the original utterance 2008 in order to preserve semantic meaning. Thus, for the 'Hello (wave) how are you' utterance 2008, contexts 2100 generated therefrom include 'Hello (wave)', 'Hello (wave) how', 'Hello (wave) how are', 'Hello (wave) how are you', '(wave) how' '(wave) how are', and '(wave) how are you'. All of these contexts 2100 include the gesture (wave), and include the words only in the order in which they appear in the utterance 2008. Thus, the context 2100 'Hello (wave) are' is not generated, although those words and gesture are a combination of the words and gesture in the utterance 2008, because 'Hello (wave) are' does not maintain the integrity of the word order in the original utterance 2008. Another rule used in the preferred embodiment is that punctuation is ignored for the purposes of assessing whether a context is non-duplicative, as punctuation does not add informational content for the purpose of context generation. FIGS. 21*b* and 21*c* illustrates other examples of the generation of the contexts 2100 from utterances. In FIG. 21*b*, for the utterance 'Talk to you later (bow)', the application module 120 generates 'Talk to you later (bow)', 'to you later (bow)', 'you later (bow)', and 'later (bow)' as contexts 2100. FIG. 21*c* illustrates context generating from the utterance 'Hello (wave) to everyone,' and shows the generation of 'Hello (wave),' 'Hello (wave) to', 'Hello (wave) to everyone', '(wave) to', and '(wave) to everyone'. One of ordinary skill in the art would know how to implement software or hardware to generate contexts 2100 given these rules and descriptions.

Once the contexts 2100 are generated 1912, they are compared 1916 with the utterances in the utterance log 2000 to determine if any of the newly generated contexts 2100 should form the basis of a new behavioral rule 1116. In the preferred embodiment, each utterance in the utterance log 2000 is maintained as a series of contexts 2100 generated from the utterance 2008 as described with respect to FIGS. 21*a*14 21*c*. Thus, the newly generated contexts 2100 are compared with the existing contexts 2100 to determine context occurrence counts for each newly generated context 2100. A context occurrence count is the number of times the context 2100 occurs in the utterance log 2000. For example, in the utterance log 2000 of FIG. 20, the 'Hello (wave)' context 2100 has a context occurrence count of 3 (from 'Hello (wave)', 'Hello, (wave) Rupert', and 'Hello (wave) to everyone'. The addition of 'Hello (wave) how are you' would increase the context occurrence count of the 'Hello (wave)' context 2100 to four.

Then, the context occurrence count is compared 1920 against a threshold to determine whether the context 2100 has occurred at a sufficient frequency to warrant the generation of a new rule 116. The threshold is set to determine how often a user must repeat a behavior before considering that behavior a rule. In the example of FIG. 20, if the threshold is five, the application module 120 determines 1924 that there is no basis to generate a rule 116 based on the contexts 2100 generated from the 'Hello(wave)' utterance 2008. If the threshold is three, however, a new behavioral rule 1116 will be generated 1928 responsive to the 'Hello (wave)' context 2100.

Figure 22A:
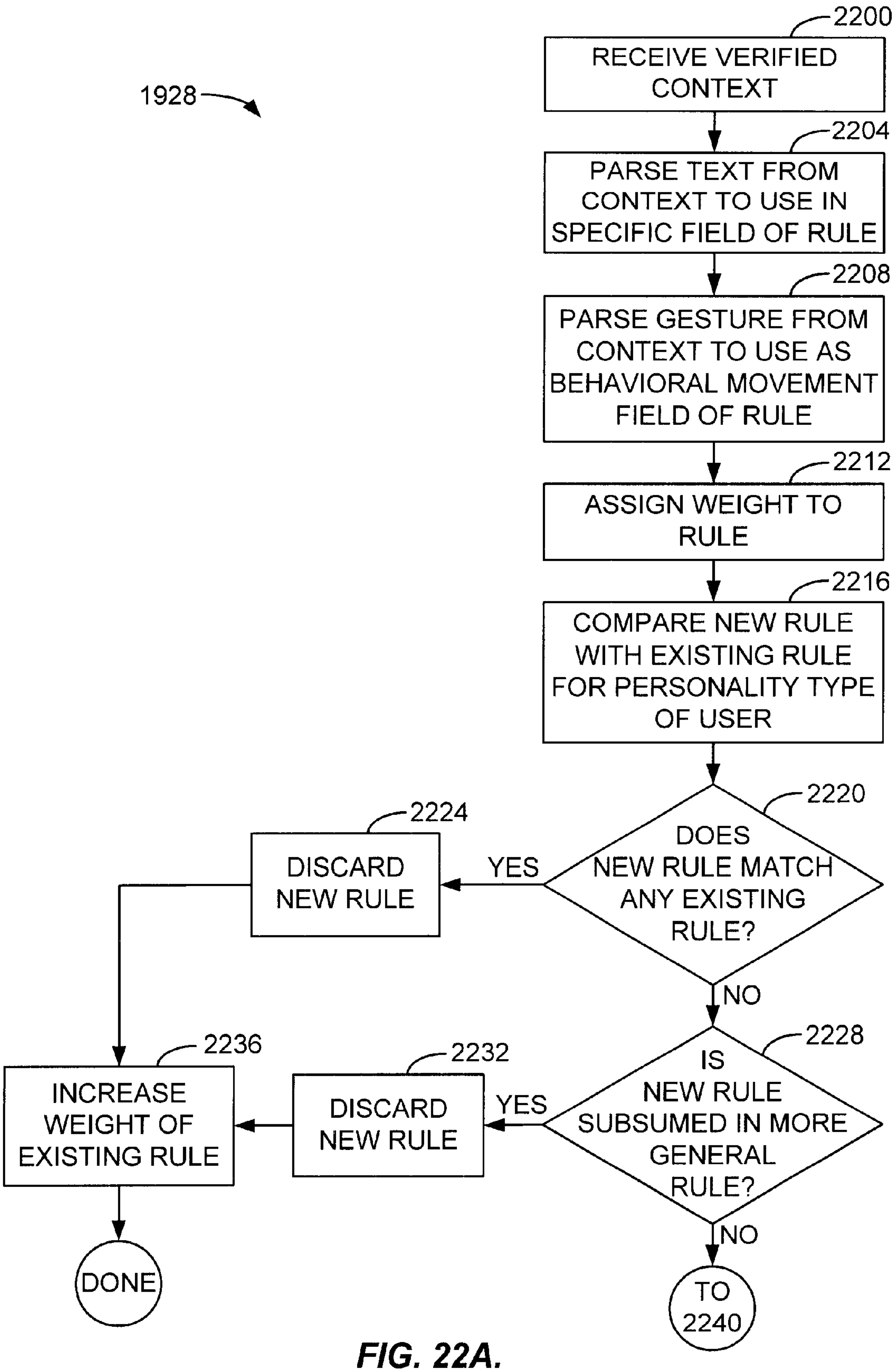
FIG. 22 is a flow chart illustrating generating a behavioral rule from a context.
Figure 22B:
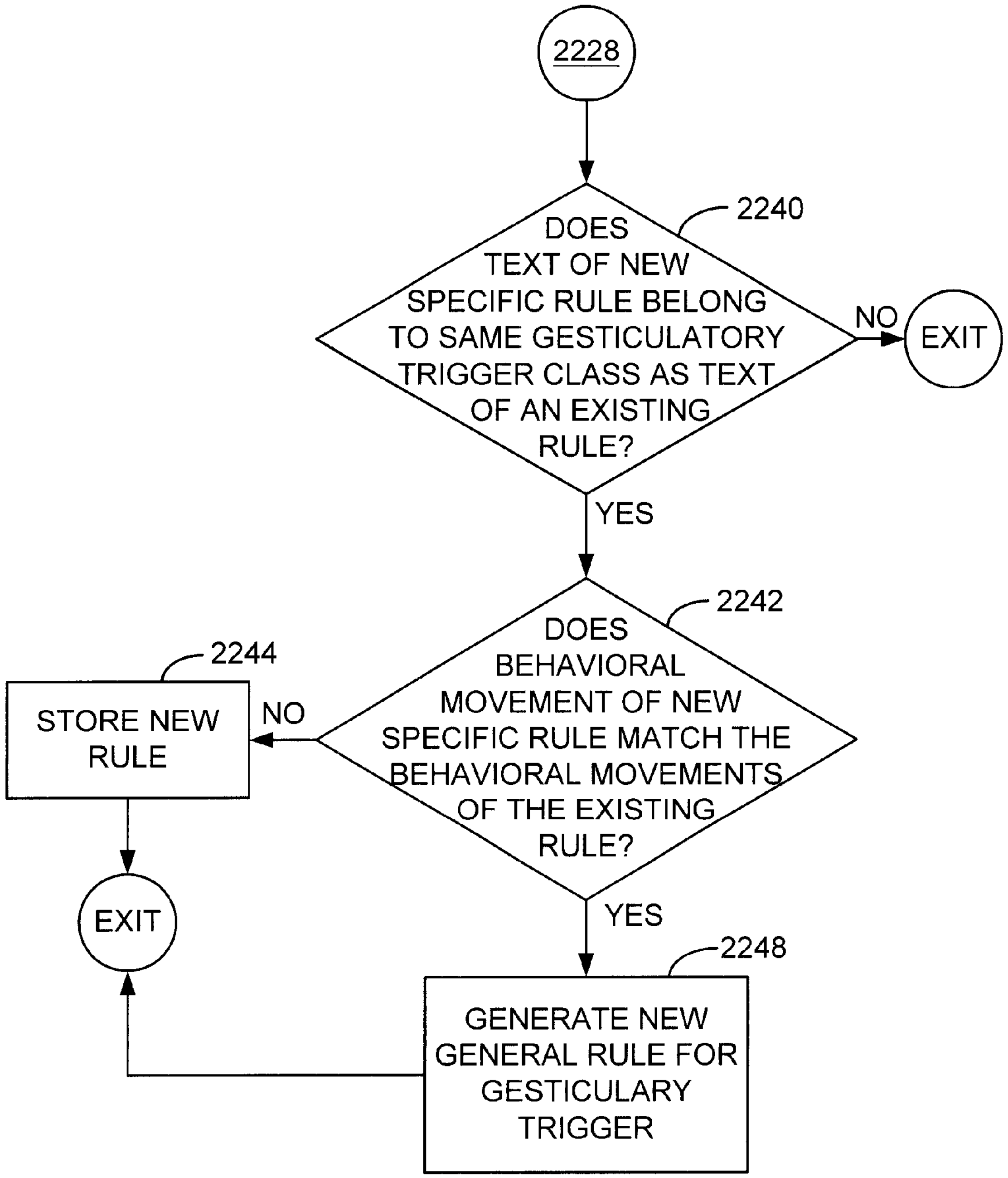

FIG. 22 illustrates a process 1928 for generating a new behavioral rule 1116 from a context 2100. As discussed above, a behavioral rule 1116 comprises of a context, a weight, and a behavioral movement. For learned behavioral rules, the initial rule 1116 generated from a context 2100 uses the Specific gesticulatory trigger class, which is simply a literal word string. Additionally, an arbitrary weight is initially assigned for the rule 1116 that can be adjusted in accordance with subsequent use of the rule 1116. As shown in FIG. 22, first, a verified context 2100 is received 2200 by the application module 120. A verified context is a context 2100 that has been determined to be appropriate for generating a new behavioral rule 1116. Next, the text from the context 2100 is parsed 2204 by the application module 120 to use as the content for the Specific gesticulatory trigger field of the behavioral rule 1116. Then, the gesture 2008 is parsed from the context 2100 to use as the behavioral movement 320 of the new behavioral rule 1116. Next, an arbitrary weight is assigned 2212. In one embodiment, a weight of 10 is assigned for a new rule 1116, which would require the behavioral movement 320 to be animated each time the gesticulatory trigger is encountered in an utterance. Once the weight is assigned, the new rule 1116 is complete.

In one embodiment, the application module 120 avoids duplication of rules. Accordingly, the application module 120 compares 2216 the new rule with existing 1116 rules assigned to the user's virtual representation 232, to determine 2220 whether or not the new rule 1116 matches any existing rule 1116. If the new rule 1116 does match an existing rule 1116, the new rule 1116 is discarded 2224, thus avoiding the maintenance of unnecessary data. In a further embodiment, the weight of the existing rule is increased 2236, as it can be inferred that if a duplicative new rule has been created, the existing rule is being used fairly often and thus should occur at a higher frequency when the gesticulatory trigger is encountered in a user's utterance.

If the new rule 1116 does not match an existing rule, the application module 120 preferably determines 2228 whether a more general rule 1116 subsumes the new rule. For example, if the new rule 1116 is {10 *yup* nod}, and an existing rule is {5, *Affirmative*, nod}, then the new rule can be discarded because 'yup' is a subset of 'Affirmative.' To confirm that 'yup', a Specific, is subsumed within a larger gesticulatory trigger class, the lexicon of the user is examined for the presence of the word 'yup.' If 'yup' is part of the lexicon, then the gesticulatory trigger class of the term 'yup' examined. If 'yup' is assigned to a gesticulatory trigger class, for example, 'Affirmative', then the existing rules 1116 of the user are examined to determine if there is an existing rule 1116 for that gesticulatory trigger class that also has the identical behavioral movement 320 as prescribed in the proposed new rule 1116. If an existing rule 1116 has a gesticulatory trigger class that is the same gesticulatory trigger class assigned to the new rule 1116, and both rules 1116 are assigned the same behavioral movement 320, then the methodology of the present invention considers the new rule 1116 to be subsumed within the existing rule 1116. For example, if {5, *Affirmative*, nod} is an existing rule 1116, the application module 120 will consider {10, 'yup', nod} as being subsumed because the gesticulatory trigger class 'Affirmative' is the same, and the behavioral movement 'Nod' is the same. If the new rule is subsumed, then the new rule is discarded 2232. However, if the behavioral movements are different, then the newly general rule is kept as a new rule. The new behavioral movement is learned. Again, in a preferred embodiment, the weight of the existing rule 1116 is then increased to reflect the increased occurrence rate of the use of the rule 1116.

In a further embodiment, new rules 1116 are used as the basis to create additional new rules 1116. For example, if a new rule is {10, 'yes', nod}, and there is an existing {10, 'yup', nod}, and the lexicon of a user has both 'yes' and 'yup', and both are assigned to the same gesticulatory class, for example, 'Affirmative', then a new, more general, rule is created {10,*Affirmative*, nod}. This new rule 1116 now allows the virtual representation 232 to animate behavior for words the user has never entered in an utterance. For example if the word 'yeah' is part of the user's lexicon, and if 'yeah' is assigned to the gesticulatory trigger class 'Affirmative', and has a different behavioral movement associated with it then if the user inputs, for the first time, the word 'yeah', the application module will apply the general {10, *Affirmative*, nod} rule and have the virtual representation 232 nod in response, in addition to whatever behavioral movement was already assigned to 'yeah'.

Thus, as shown in FIG. 22, the application module 120 determines 2240 whether the text of the Specific field of the new rule 1116 belongs to a gesticulatory trigger class of text of the Specific field of an existing rule. In the above example, the application module 120 determines whether new rule text 'yes' has the same gesticulatory trigger class as an existing rule {10, 'yup', nod}. If there is a match, the application module 120 determines 2242 whether the new rule 1116 and the existing rule(s) 1116 have the same behavioral movements 320. In the above example, the application module 120 determines whether {10, 'yes', nod} has the same behavioral movement as {10, 'yup', nod}. If there are no matches, the new rule 1116 is stored 2244 as a new behavioral rule 1116 for that user's visual representation 232. If there is a match, then a new general rule is generated 2248 using an arbitrary weight, the behavioral movement 320 common to the new rule 11 16 and the existing rules 1116, and the gesticulatory trigger class associated with the text of the new rule 1116 and the existing rules 1116. Thus, in the above example, the new rule {10, *Affirmative*, Nod} is created using an arbitrary weight '10', the common gesticulatory trigger class 'Affirmative' of 'yes' and 'yup' and the common behavioral movement 320 'Nod'. The weight assigned can be arbitrarily determined, or it can be calculated as an average of the weights assigned to the specific rule 1116 and the existing rules 1116.

In a preferred embodiment, a new general rule 1116 is not created unless the number of existing rules 1116 that could serve as a basis for the new generated rule 1116 exceeds a threshold. For example, if 2 rules such as {10 *yes* nod} and {5 *yup* nod} are the rules being used to generate a new general rule 1116, and the threshold is three, no new general rule 1116 is created. The use of a threshold provides control over how persistent a user's behavior must be before generating a new general rule 1116. This also allows the application module to control rule generation based on how active a user wants his or her visual representation to be during communication sessions. If the user is very active, and thus uses a large number of gestures, more specific ad general behavioral rules 1116 will be generated for that user's visual representation. This further tailors the visual representation's behavior to the user. Thus, in accordance with the present invention, the visual representation can learn behavior without explicit user input, and can learn behavior that allows it to emulate more closely the user's own behavior.

What is claimed is:

1. A method for adapting a behavior of an animated visual representation of a first user to the behavior of the first user:

receiving data from the first user intended for communication to a second user;

determining whether the received data contains a text string and a gesture command associated with the text string; and if so learning a behavioral rule for animating a visual representation of the first user based on the received data; and animating the visual representation of the first user to the second user responsive to the learned behavioral rule.

2. The method of claim 1 wherein learning comprises:

storing the received data in a set of received data strings; and analyzing the set of received data strings to generate a new behavioral rule.

3. A method of adapting a behavior of an animated visual representation of a first user to the behavior of the first user, comprising:

receiving data from the first user intended for communication to a second user;

learning a behavioral rule for animating a visual representation of the first user based on the received data, by:

determining whether the received data contain at least one text string;

determining whether the received data contains at least one gesture command;

responsive to the received data containing at least one text string and at least one gesture command, determining that the received data has content relevant to rule generation;

responsive to determining that the received data has content relevant to rule generation, storing the received data in a set of received data strings having content relevant to rule generation; and analyzing the set of received data strings to generate a new behavioral rule; and animating the visual representation of the first user to the second user responsive to the learned behavioral rule.

4. The method of claim 3 further comprising:

determining whether an existing behavioral rule contains the text string of the received data; and responsive to an existing behavioral rule containing the text string of the received data, discarding the received data.

5. The method of claim 2 wherein analyzing the set of received data strings to generate a new behavioral rule comprises:

comparing the received text string and associated gesture command to stored text strings and associated gesture commands to determine a frequency of occurrence of the received text string and associated gesture command; and responsive to the received text string and associated gesture command occurring at a frequency exceeding a predetermined threshold, generating a behavioral rule from the selected text string and associated gesture command.

6. The method of claim 5 wherein generating further comprises:

establishing a behavioral rule linking the text string to the associated gesture command.

7. The method of claim 5 wherein the generated behavioral rule contains a text string and an associated behavioral movement command, the method further comprising:

determining whether the text string of the generated behavioral rule is associated with an existing behavioral rule;

responsive to determining that the text string of the generated behavioral rule is associated with an existing behavioral rule, discarding the generated behavioral rule.

8. The method of claim 2 wherein analyzing the set of received data strings to generate a new behavioral rule comprises:

identifying a text category for the received text string;

identifying text strings belonging to the identified text category having associated gesture commands matching the associated gesture command of the received text string;

determining a number of text strings belonging to the identified text category having matching associated behavioral rules;

determining whether the identified text category is associated with an behavioral rule;

responsive to determining that the identified text category is not associated with an behavioral rule, determining whether the number of text strings belonging to the identified text category having matching associated behavioral rules exceeds a predetermined threshold; and generating a new behavioral rule responsive to determining that the number of text strings belonging to the identified text category having matching associated behavioral rules exceeds a predetermined threshold.

9. The method of claim 8 wherein a behavioral rule has a behavioral movement field, and the behavioral movement of the selected text is used in the behavioral movement field of the generated behavioral rule.

10. The method of claim 8 wherein a behavioral rule has a text category field, and the identified text category is used as the text category for the text category field of the generated behavioral rule.

11. The method of claim 2 wherein the received data is parsed into contexts, wherein each context is a unique combination of text and a behavioral command, and wherein storing comprises storing contexts parsed from the received data, and analyzing further comprises analyzing the set of stored contexts.

12. A method of generating behavioral rules for controlling animation of a visual representation of a user comprising:

receiving an utterance from a user, wherein an utterance comprises a text string and optionally a gesture command for controlling the animation of the visual representation;

parsing the received utterance to determine whether the utterance contains a gesture command;

responsive to the utterance containing a gesture command storing the received utterance in a set of previously stored utterances containing gesture commands;

analyzing the stored utterances to generate a new behavioral rule for controlling the animation of the user's visual representation.

13. The method of claim 12 wherein storing further comprises:

generating contexts from the received utterance, wherein contexts comprise text in combination with a gesture command;

storing the generated contexts in a set of previously stored contexts; and wherein analyzing further comprises:

analyzing the stored contexts to generate a new behavioral rule for controlling the animation of the user's visual representation.

14. The method of claim 13 wherein generating contexts further comprises:

parsing the utterance for unique combinations of text and at least one-behavioral movement; and designating each unique combination of text and at least one behavioral movement as a context.

15. The method of claim 13 wherein analyzing the stored contexts further comprises:

comparing the behavioral movements of the stored utterances to determine a set of contexts having matching behavioral movements;

comparing the text associated with each context to determine a set of contexts having matching text;

identifying a number of contexts belonging to an intersection of the sets of contexts having matching behavioral movements and matching text; and responsive to the determined number exceeding a predefined threshold, generating a new behavioral rule responsive to the text and behavioral movement of the identified contexts.

16. The method of claim 15 further comprising:

comparing the generated rule to existing behavioral rules associated with the user's visual representation; and responsive to determining that an existing behavioral rule matches the generated rule, discarding the generated rule.

17. The method of claim 13 wherein analyzing the stored contexts further comprises:

selecting a context generated from the received utterance;

determining whether the text associated with the selected context is associated with a text category;

responsive to determining that the text associated with the selected context is associated with a text category, determining whether any stored context has text associated with the same text category and has a matching associated behavioral movement;

responsive to identifying at least one stored context having text associated with the same text category and has a matching behavioral movement, determining whether the text category is associated with a behavioral rule; and responsive to determining that the text category is not associated with a behavioral rule, generating a behavioral rule having fields responsive to the behavioral movement associated with the selected context and the text category.

18. A method of learning a behavioral rule for use in animating a visual representation of a first user to a second user, comprising:

receiving data from the first user intended for communication to the second user;

determining whether the received data contains a text string and a gesture command;

responsive to the received data containing a text string and a gesture command, learning a behavioral rule for animating a visual representation of the first user based on the received data.

19. The method of claim 18, further comprising animating the visual representation of the first user to the second user responsive to the learned behavioral rule.

20. The method of claim 18, wherein learning includes:

storing the received data in a set of received data strings; and analyzing the set of received data strings to generate a new behavioral rule.

21. The method of claim 20, wherein analyzing includes:

comparing the received text string and gesture command to stored text strings and associated gesture commands to determine a frequency of occurrence of the received text string and gesture command; and if the frequency of occurrence exceeds a predetermined threshold, generating the new behavioral rule based on the received data.

22. The method of claim 21, wherein the new behavioral rule links the received gesture command to at least a portion of the received text string.

23. The method of claim 21, wherein the new behavioral rule includes a text string and an associated gesture command, the method further comprising:

determining whether the text string of the new behavioral rule is associated with an existing behavioral rule, and if so, discarding the new behavioral rule.

24. The method of claim 20, wherein analyzing includes:

identifying a text category for the received text string;

gesture identifying text strings belonging to the identified text category having associated gesture commands matching the received gesture command;

determining a number of the identified text strings having matching associated behavioral rules;

determining whether the identified text category is associated with a behavioral rule;

responsive to determining that the identified text category is not associated with a behavioral rule, determining whether the number of identified text strings exceeds a predetermined threshold; and if the number exceeds the threshold, generating the new behavioral rule.

25. The method of claim 24, wherein a behavioral rule has a gesture field, and wherein the received gesture command is used in the gesture field of the generated behavioral rule.

26. The method of claim 24, wherein a behavioral rule has a text category field, and wherein the identified text category is used as the text category for the text category field of the generated behavioral rule.

27. The method of claim 20, wherein the received data is parsed into contexts, wherein each context is a unique combination of text and a gesture command, wherein storing comprises storing contexts parsed from the received data, and wherein analyzing comprises analyzing the set of stored contexts.

* * * * *